United States Patent
Tokuchi

(10) Patent No.: US 11,899,764 B2
(45) Date of Patent: Feb. 13, 2024

(54) INFORMATION PROCESSING APPARATUS AND NON-TRANSITORY COMPUTER READABLE MEDIUM FOR SELECTING PRESENTATION LOCATION OF TARGET IMAGE FORMED IN AIR

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 690 days.

(21) Appl. No.: 16/847,821

(22) Filed: Apr. 14, 2020

(65) Prior Publication Data
US 2021/0192028 A1    Jun. 24, 2021

(30) Foreign Application Priority Data
Dec. 19, 2019 (JP) ................................. 2019-229722

(51) Int. Cl.
G06F 21/32      (2013.01)
G06F 3/01       (2006.01)

(52) U.S. Cl.
CPC ............. *G06F 21/32* (2013.01); *G06F 3/011* (2013.01); *G06F 2221/2113* (2013.01)

(58) Field of Classification Search
CPC ... G06F 21/32; G06F 3/011; G06F 2221/2113
USPC ......................................................... 382/115
See application file for complete search history.

(56) References Cited

U.S. PATENT DOCUMENTS

| 10,574,662 B2 * | 2/2020 | Wolf .................. H04L 63/08 |
| 2018/0003979 A1 * | 1/2018 | Nakashima .......... G02B 27/017 |
| 2018/0107814 A1 * | 4/2018 | Wu .................... G06F 3/013 |
| 2021/0226796 A1 * | 7/2021 | Ok .................... G06K 7/1417 |

FOREIGN PATENT DOCUMENTS

JP       2019-040463 A      3/2019

OTHER PUBLICATIONS

Aug. 22, 2023 Office Action issued in Japanese Patent Application No. 2019-229722.

* cited by examiner

*Primary Examiner* — Gabriel I Garcia
(74) *Attorney, Agent, or Firm* — Oliff PLC

(57) ABSTRACT

An information processing apparatus includes a processor configured to control change of an image in accordance with a situation in a place where authentication is executed, the image being formed in air to indicate a position where information is to be read in a non-contact manner from an object used for the authentication.

11 Claims, 19 Drawing Sheets

INFORMATION PROCESSING APPARATUS AND NON-TRANSITORY COMPUTER READABLE MEDIUM FOR SELECTING PRESENTATION LOCATION OF TARGET IMAGE FORMED IN AIR

CROSS-REFERENCE TO RELATED APPLICATIONS

This application is based on and claims priority under 35 USC 119 from Japanese Patent Application No. 2019-229722 filed Dec. 19, 2019.

BACKGROUND

(i) Technical Field

The present disclosure relates to an information processing apparatus and a non-transitory computer readable medium.

(ii) Related Art

Currently, there are various techniques for authenticating individuals. One example of the techniques is a technique of scanning a retina pattern or a vein pattern. According to this technique, a user who requests authentication brings his eye or hand close to a specific position of a reading device that is mounted at a fixed position.

See, for example, Japanese Unexamined Patent Application Publication No. 2019-40463.

SUMMARY

There are techniques for authenticating an individual by reading biological information without physical contact of a body part with a reading device. One example of the techniques is a technique for authenticating an individual by prompting a person who requests authentication to place his or her hand over a hand image formed in the air. However, such a non-contact type authentication technique assumes a fixed reading device.

Aspects of non-limiting embodiments of the present disclosure relate to more easily addressing a change of a situation in a place where authentication is executed than a case where an object used for authentication is read irrespective of a situation in a place where authentication is executed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to control change of an image in accordance with a situation in a place where authentication is executed, the image being formed in air to indicate a position where information is to be read in a non-contact manner from an object used for the authentication.

BRIEF DESCRIPTION OF THE DRAWINGS

Exemplary embodiments of the present disclosure will be described in detail based on the following figures, wherein:

FIG. 6A illustrates a case where the person who requests authentication is gazing in a direction of the Y-axis and FIG. 6B illustrates a case where the person who requests authentication is gazing in a direction of the X-axis;

FIG. 7A illustrates a state at a time T1 before start of the authentication, FIG. 7B illustrates a state at a time T2 at which formation of an aerial image has started, and FIG. 7C illustrates a state at a time T3 at which the authentication has ended;

FIG. 8A illustrates a state at a time T1 before start of the authentication, FIG. 8B illustrates a state at a time T2 at which formation of an aerial image has started, and FIG. 8C illustrates a state at a time T3 at which the authentication has ended;

FIG. 9A illustrates a state at a time T1 before start of the authentication, FIG. 9B illustrates a state at a time T2 at which formation of an aerial image has started, and FIG. 9C illustrates a state at a time T3 at which the authentication has ended;

FIG. 10A illustrates a state at a time T2 at which formation of an aerial image has started and FIG. 10B illustrates a state at a time T3 at which the authentication has ended;

FIG. 11A illustrates a state at a time T2 at which formation of an aerial image has started and FIG. 11B illustrates a state at a time T3 at which the authentication has ended;

FIG. 12A illustrates a state at a time T2 at which formation of an aerial image has started and FIG. 12B illustrates a state at a time T3 at which the authentication has ended;

FIG. 14A is a plan view of the place where authentication is executed and illustrates a positional relationship among a person who requests authentication and sensor devices for authentication and FIG. 14B illustrates an example of an aerial image formed in consideration of an obstacle;

FIG. 15A is a plan view of the place where authentication is executed and illustrates a positional relationship among a person who requests authentication and sensor devices for authentication and FIG. 15B illustrates an example of an aerial image formed in consideration of an obstacle;

FIG. 17A illustrates a position of an aerial image formed in N-th authentication, FIG. 17B illustrates a position of an aerial image formed in (N+1)th authentication, and FIG. 17C illustrates a position of an aerial image formed in (N+2)th authentication;

DETAILED DESCRIPTION

Exemplary embodiments of the present disclosure are described below with reference to the drawings.

First Exemplary Embodiment

System Configuration

Figure 1:
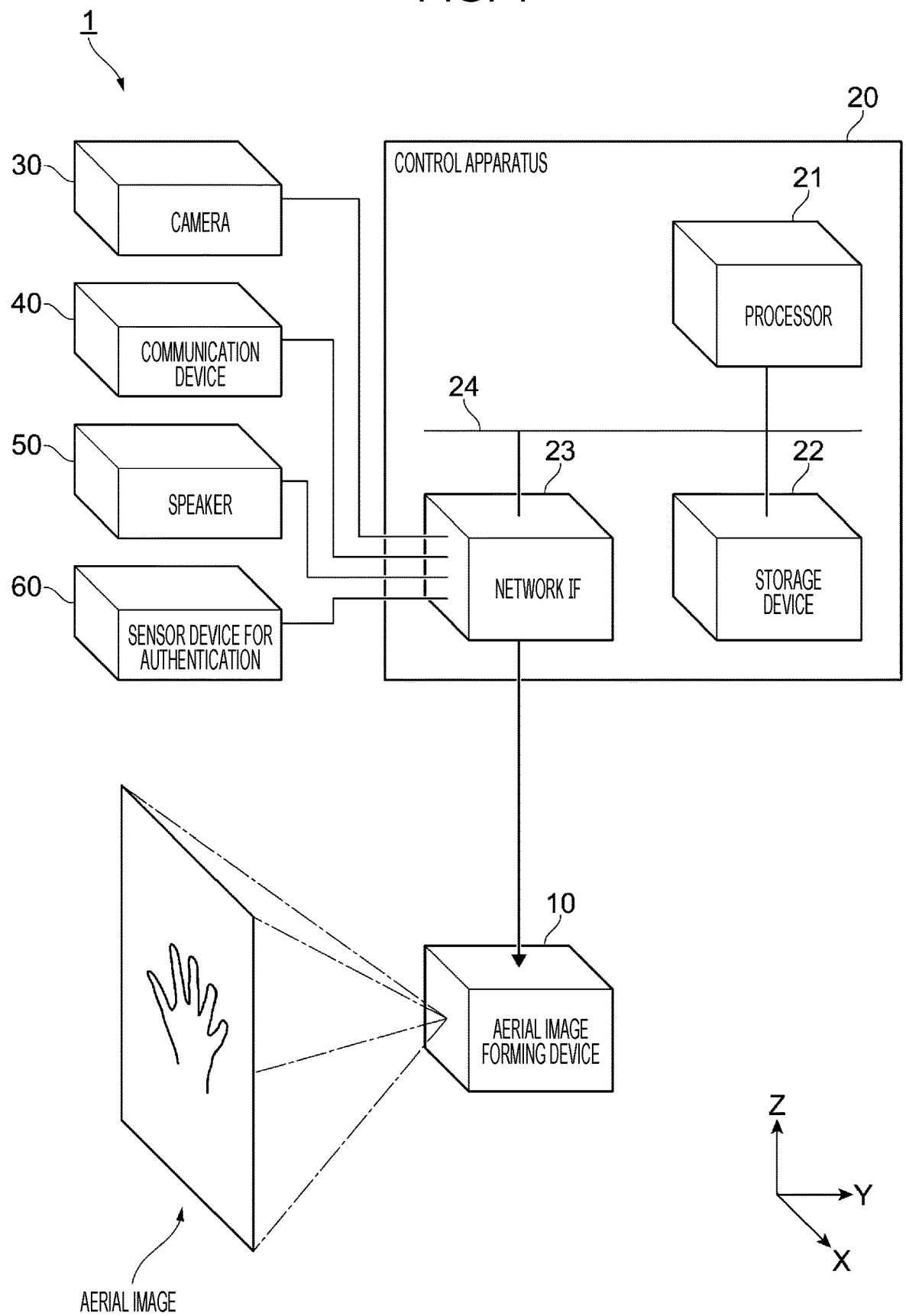
FIG. 1 illustrates an example of a configuration of an information processing system used in the first exemplary embodiment.

FIG. 1 illustrates an example of a configuration of an information processing system 1 used in the first exemplary embodiment.

The information processing system 1 illustrated in FIG. 1 includes an aerial image forming device 10 that forms an image floating in the air (hereinafter referred to as an "aerial image"), a control apparatus 20 that controls devices including the aerial image forming device 10, a camera 30 that is used to acquire information on characteristics of a body of a person who requests authentication and information on an environment of a place where authentication is executed, a communication device 40 that is used to acquire information used for authentication from an information terminal of a person who requests authentication through directional communication, a speaker 50 that is used, for example, to notify a person who requests authentication about a result of the authentication, and an sensor device for authentication 60 that acquires information used for authentication from a part of a body of a person who requests authentication.

The communication device 40 is unnecessary in a case where information used for authentication is not acquired from an information terminal. Similarly, the sensor device for authentication 60 is unnecessary in a case where information used for authentication is not acquired from a part of a body of a person who requests authentication.

The information processing system 1 used in the first exemplary embodiment includes the communication device 40 and the sensor device for authentication 60 so that information used for authentication can be acquired from an information terminal and information used for authentication can be acquired from a part of a body of a person who requests authentication.

Both of the communication device 40 and the sensor device for authentication 60 are unnecessary in a case where only an image taken by the camera 30 is used to acquire information used for authentication.

In the present exemplary embodiment, information to be authenticated is not limited to an individual and may be, for example, whether or not a person has an authority to enter a room or whether or not a user has an authority to use specific service.

In the present exemplary embodiment, an aerial image is used to guide an object used for authentication to a specific position, height, direction, and inclination (hereinafter referred to as a "position and the like") where information used for authentication is read. The position is given, for example, by coordinates within a horizontal plane, and the height is given, for example, by a coordinate in a vertical direction. The direction is given, for example, by a rotation angle from a reference direction within a horizontal plane, and the inclination is given, for example, by a rotation angle from a vertical direction.

In other words, an aerial image is used as a mark for guiding an object used for authentication. Examples of the object used for authentication include a part of a body of a person who requests authentication and an information terminal.

An aerial image in the present exemplary embodiment varies depending on an object used for authentication. The position and the like where an aerial image is formed are an example of a position of a region where information is read from an object used for authentication in a non-contact manner.

In the example of FIG. 1, veins of a right hand are used for authentication. Accordingly, in the example illustrated in FIG. 1, an aerial image is formed so that a palm of a right hand faces the sensor device for authentication 60. Since the aerial image is a mark for a person who request authentication, an image of a back of a right hand is formed in the air. The aerial image is formed to present specific height and direction so that information used for authentication is acquired.

In a case where a face is used for authentication, an aerial image for guiding a head to specific height and direction is formed. It may be easier for a person who requests authentication to adjust his or her head in the same manner as a case where the person is looking at a mirror. In this case, not an aerial image of a back of a head but an aerial image of a face is formed.

Since an aerial image is a mark, an aerial image need not necessarily be an image of an object used for authentication.

In the present exemplary embodiment, the position and the like where an aerial image is formed are set according to a position and the like where information used for authentication can be correctly acquired by the sensor device for authentication 60.

In the present exemplary embodiment, when a person who requests authentication places a part of his or her body or an information terminal over an aerial image, information used for authentication is acquired by the sensor device for authentication 60 or the communication device 40. In the present exemplary embodiment, the aerial image indicates a position where information is read from an object used for authentication in a non-contact manner.

A shape of an aerial image used in the present exemplary embodiment is not limited in particular and may be a three-dimensional shape or a two-dimensional shape. The three-dimensional shape is, for example, a shape of a part of a human body or a shape of an information terminal. Similarly, the two-dimensional shape is, for example, a shape of a part of a human body or a shape of an information terminal.

The aerial image formed in the air is not limited to an image that defines a surface of a three-dimensional object and may be constituted by both of an image that defines a surface of a three-dimensional object and an image corresponding to an inside of the three-dimensional object. In other words, the aerial image may be, for example, expressed by data (e.g., voxel data) in which not only a surface of a three-dimensional object but also a structure of an inside of the three-dimensional object are given an image attribute. The aerial image in the present exemplary embodiment may be a still image or may be a moving image.

The aerial image in the present exemplary embodiment also functions to visually notify a person who requests authentication about success or failure of the authentication. For example, an aerial image of an opened door is formed in front of a person who has succeeded in authentication. Meanwhile, an aerial image of a closed door is formed in front of a person who has failed in authentication.

The aerial image forming device 10 in the present exemplary embodiment is a device that directly forms an aerial image in the air. To realize such a device, various methods have been proposed, and some of the methods have been put into practical use.

Examples of such methods include a method using a half mirror, a method using a beam splitter, a method using a minute mirror array, a method using a minute lens array, and a method using plasma emission or hologram. An aerial image formed by any of these methods allows an object to pass therethrough.

The control apparatus 20 includes a processor 21 that controls formation of an aerial image by the aerial image forming device 10 through execution of a program, a storage device 22 in which the program and various kinds of data are stored, a network interface (IF) 23 that realizes communication with an outside, and a bus and a signal line 24 for connecting these members. The control apparatus 20 is an example of an information processing apparatus.

The processor 21 is, for example, a CPU. The storage device 22 includes a read only memory (ROM) in which a basic input output system (BIOS) and the like are stored, a random access memory (RAM) used as a work area, and a hard disk device in which a basic program, an application program, and the like are stored.

The ROM and the RAM may be included in the processor 21. The processor 21 and the storage device 22 constitute a computer.

The camera 30 is used to take an image of a person around an aerial image. In the present exemplary embodiment, the camera 30 is used to acquire information on characteristics of a body of a person who requests authentication such as a body height of the person, an age group to which the person belongs, a direction in which the body of the person is facing, and whether or not the person is in a wheelchair and information on an environment in a place where authentication is executed such as whether or not there is an obstacle in a space where an aerial image can be formed. The information on characteristics of a body of a person who requests authentication and the information on an environment in a place where authentication is executed are examples of a situation in a place where authentication is executed. Note that a situation in a place where authentication is executed is specified by the processor 21.

The communication device 40 is used to communicate with an information terminal which a person owns and acquire information used for authentication that is registered in association with account information of the information terminal. The information used for authentication includes information for identifying an individual such as a name, an employee number, a member number, a fingerprint pattern image, or a vein pattern image of the person who requests authentication. The communication device 40 in the present exemplary embodiment uses communication having high directivity as communication used for authentication. For example, the communication device 40 in the present exemplary embodiment supports visible light communication or infrared communication. In a case where the information terminal is equipped with an antenna having high directivity, communication using radio waves is also possible.

The speaker 50 is used to notify a person who requests authentication about a result of the authentication by using sound.

The sensor device for authentication 60 is a device that acquires information used for authentication from a part of a body of a person who requests authentication. The information used for authentication varies depending on an environment in which the information processing system 1 is used. The sensor device for authentication 60 in the present exemplary embodiment uses, as the information used for authentication, information on veins of a hand or a finger, a fingerprint, a shape of a palm, a face, an iris, or an auricle. The sensor device for authentication 60 varies depending on the information used for authentication.

For example, in a case where a vein pattern is used for authentication, the sensor device for authentication 60 includes a light emitting diode (LED) that radiates a near infrared ray to a position used for authentication and a camera that takes an image of near infrared light that has passed through or has been reflected on a target portion.

Authentication Process

Figure 2:
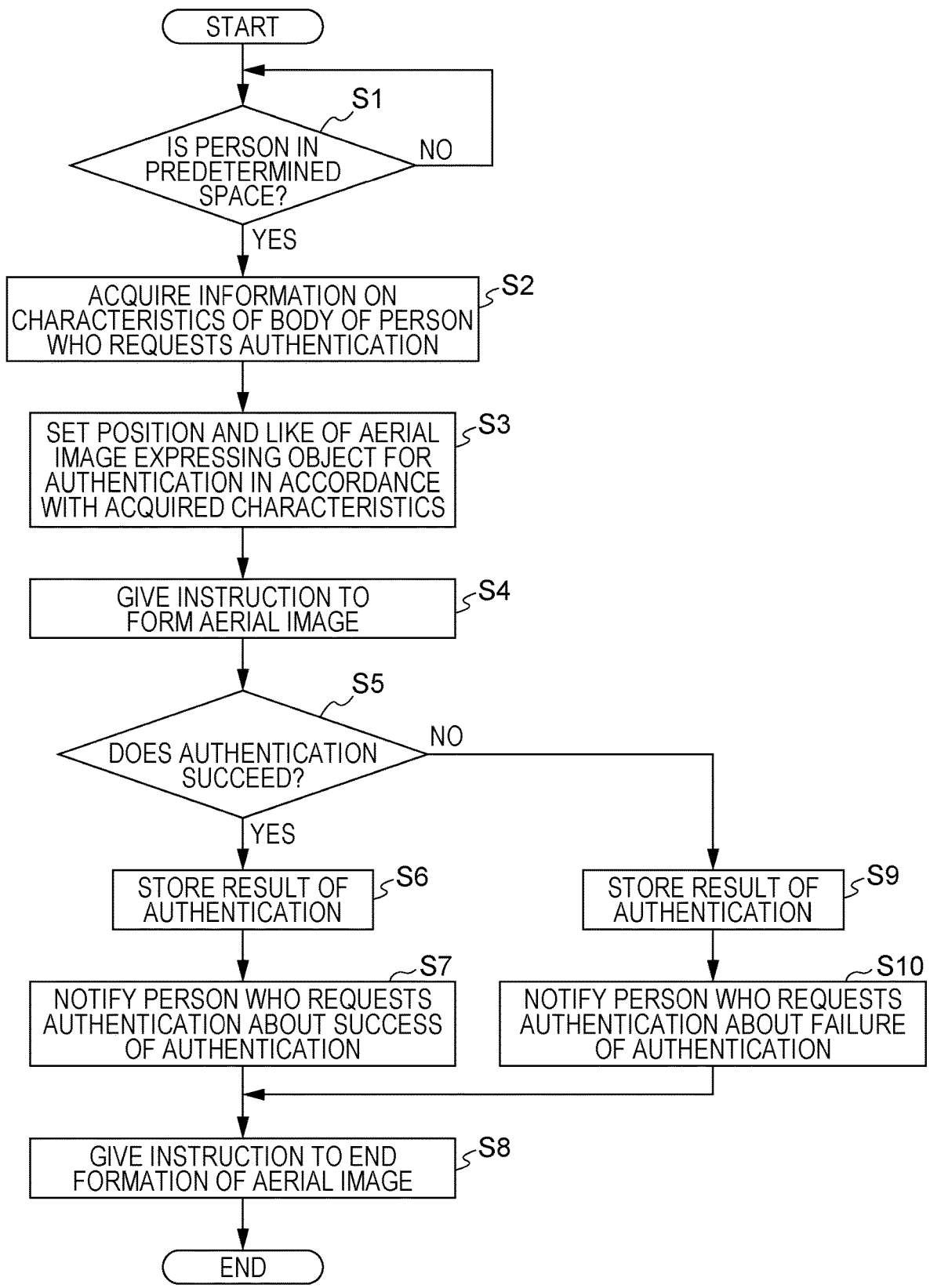
FIG. 2 is a flowchart for explaining a procedure of an authentication process executed in the first exemplary embodiment.

FIG. 2 is a flowchart for explaining a procedure of an authentication process executed in the first exemplary embodiment. The process illustrated in FIG. 2 is realized by execution of a program by the processor 21 (see FIG. 1).

First, the processor 21 determines whether or not a person is in a predetermined space (step 1). The space is set to distinguish a person who requests authentication from other persons. For the determination in step 1, an image taken by the camera 30 (see FIG. 1) or an output from a human sensor (not illustrated) is used for example. For example, in a case where an image is used, it is determined that a person who requests authentication is in a predetermined space upon detection of a person within a specific range of a taken image. In the present exemplary embodiment, the processor 21 determines whether or not a subject within an image is a person by processing the image. For example, in a case where the subject is an animal, the processor 21 obtains a negative result in step 1. In the present exemplary embodiment, a person whose presence in the predetermined space has been confirmed is regarded as a person who requests authentication.

The processor 21 repeats the determination in step 1 while a negative result is being obtained in step 1.

In a case where a positive result is obtained in step 1, the processor 21 acquires information on characteristics of a body of the person who requests authentication (step 2). In the present exemplary embodiment, the processor 21 acquires, for example, a body height of the person, a direction in which the body of the person is facing, an age group to which the person belongs, whether or not the person in in a wheelchair, and/or whether or not the person is wearing a plaster cast as the characteristics of the body of the person. These pieces of information are examples of the characteristics of the body of the person.

In the present exemplary embodiment, the processor 21 acquires one or more of these pieces of information as needed. These pieces of information are acquired, for example, through analysis conducted by the processor 21 on an image taken by the camera 30.

A method for acquiring these pieces of information is not limited to image analysis. For example, a highest position at which an infrared ray emitted from any one of plural infrared sensors for detecting different heights is cut across is detected as the body height. In the present exemplary embodiment, the acquired body height need not be exact since the body height is used to set a height of an aerial image formed as a guide for authentication.

The direction in which the person is facing is referred to for setting of a direction and an inclination of an aerial image formed in the air.

In the present exemplary embodiment, the age group is used to determine whether or not the person who requests authentication is an adult or a child. The age group is also used to set a height at which an aerial image is formed. Note, however, that in a case where a body part used for authentication is changed depending on the age group, the acquired information on the age group is used to change contents of an aerial image.

Whether or not the person is in a wheelchair is used to set a height at which an aerial image is formed. In a case where the person is in a wheelchair, a height at which an aerial image is formed needs to be determined based on a state where the person is sitting in the wheelchair.

Whether or not the person is wearing a plaster cast is acquired because it is often difficult to use a body part wearing a plaster cast for authentication. For example, in a case where the person who requests authentication is wearing a plaster cast on a right hand, movement of the right hand is often restricted, and authentication using the right hand can be a burden on the person.

In the present exemplary embodiment, the information on the characteristics may be any information that can be specified through image analysis. Note that an image used for analysis is not limited to a still image and may be a moving image. For example, a moving image capturing movement to a predetermined space or an image capturing movement of a person who has entered a predetermined space may also be used for analysis.

When information on the characteristics of the body of the person who requests authentication is acquired, the processor 21 sets a position and the like where an aerial image expressing an object for authentication on the basis of the acquired characteristics (step 3).

In the present exemplary embodiment, a specific part of the body of the person who requests authentication is, for example, used as the object for authentication. For example, a vein pattern of a face, a hand, a finger, or a palm of the person is used as the object for authentication. As described above, the object for authentication may be an information terminal. The information terminal is used in a case where authentication is realized by causing the information terminal to transmit information for specifying the person who requests authentication to the communication device 40 (see FIG. 1) through communication having directivity. The information terminal is, for example, a smartphone, a tablet terminal, or a wearable terminal.

The position and the like include not only coordinates within a horizontal plane, but also a coordinate in a height direction. For example, the coordinate in a height direction is set on the basis of the body height of the person who requests authentication or a wheelchair. For example, in a case where the person who requests authentication is an adult, the height or coordinates within a horizontal plane are set so that a face of an adult can be guided thereto or the height or coordinates within a horizontal plane are set within the reach of a hand of the person. The position and the like where an aerial image is formed may vary from one authentication to the next. For example, the position and the like set for one authentication requested by a person may be different from the position and the like set for another authentication requested by the same person. In addition, a direction and an inclination of the aerial image are set. The direction and inclination of the aerial image are set within a range of a direction and an inclination in which information can be acquired by the sensor device for authentication 60 (see FIG. 1). The position is also restricted by the sensor device for authentication 60 used for authentication.

Furthermore, a size of the aerial image is set. The size of the aerial image is set in accordance with a body size of the person who requests authentication. This is because an adult and a child are different in size of a head and size of a hand.

When settings of the position and the like where an aerial image is formed are completed, the processor 21 instructs the aerial image forming device 10 (see FIG. 1) to form an aerial image (step 4). The processor 21 supplies data necessary for formation of the aerial image to the aerial image forming device 10. In FIG. 1, an image of a back of a right hand with fingers spread apart is formed as an example of the aerial image.

Then, the processor 21 causes, for example, the communication device 40 (see FIG. 1) or the sensor device for authentication 60 (see FIG. 1) to acquire information used for authentication and determines whether or not the authentication has succeeded by using this information (step 5).

For example, in a case where a part of a body is used for the authentication, information used for the authentication is successfully acquired on a condition that the part used for the authentication is correctly placed over the aerial image. Meanwhile, for example, in a case where an information terminal is used for the authentication, communication succeeds on a condition that the information terminal is correctly placed over the aerial image, and information used for the authentication is transmitted from the information terminal to the communication device 40.

In a case where success of the authentication has been confirmed in step 5, the processor 21 obtains a positive result in step 5. Then, the processor 21 stores the result of the authentication in the storage device 22 (see FIG. 1) (step 6).

Furthermore, the processor 21 notifies the person about success of the authentication (step 7). In the present exemplary embodiment, the processor 21 uses an aerial image or sound for the notification.

In the present exemplary embodiment, the processor 21 instructs the aerial image forming device 10 to finish formation of the aerial image after the notification in step 7

(step 8). Since the aerial image disappears when the authentication is finished, the position and the direction used for authentication can be kept secret from a person who requests authentication until start of the authentication. Since an aerial image is formed in the air every time authentication is executed and the aerial image disappears when the authentication is finished, an improvement of security is expected.

Meanwhile, in a case where failure of the authentication has been confirmed in step 5, the processor 21 obtains a negative result in step 5. Also in this case, the processor 21 stores the result of the authentication in the storage device 22 (step 9).

Furthermore, the processor 21 notifies the person about failure of the authentication (step 10). Also in this case, the processor 21 uses an aerial image or sound for the notification.

After the notification in step 10, the processor 21 instructs the aerial image forming device 10 to finish formation of the aerial image (step 8).

Note that formation of an aerial image need not be from the start to end of authentication. That is, an aerial image that serves as a mark of an authentication position may be always present in the air. In this case, the processes in step 4 and step 8 are unnecessary.

EXAMPLE OF FORMATION OF AERIAL IMAGE

Specific examples of a case where a position of formation of an aerial image is controlled in accordance with characteristics of a body of a person who requests authentication are described.

Example 1

Figure 3:
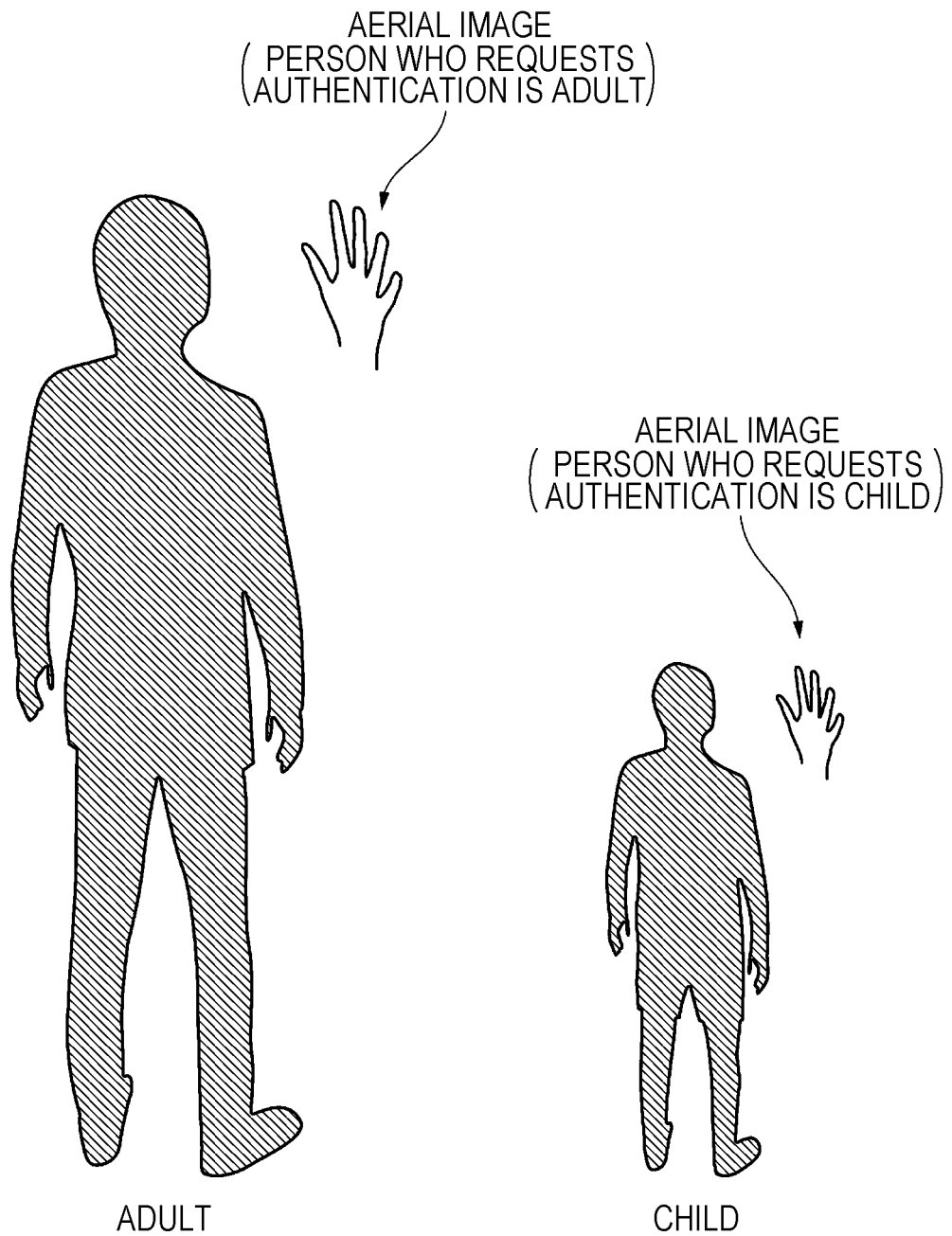
FIG. 3 is a view for explaining a difference between an aerial image formed in a case where a person who requests authentication is an adult and an aerial image formed in a case where a person who requests authentication is a child.

FIG. 3 is a view for explaining a difference between an aerial image formed in a case where a person who requests authentication is an adult and an aerial image formed in a case where a person who requests authentication is a child.

Whether a person who requests authentication is an adult or a child can be estimated through analysis of an image taken by the camera 30. Note that it is unnecessary to exactly specify an age of the person since this information is merely used to decide a position where an aerial image is formed.

In FIG. 3, a relatively tall person is regarded as an adult, and a relatively short person is regarded as a child. However, a body height varies among different individuals. There are children who are taller than adults, and there are adults who are shorter than children. A body height varies even among adults.

The relationship between a body height and an age illustrated in FIG. 3 is merely an example for explaining processing for forming an aerial image. Note that whether a person who requests authentication is an adult or a child is estimated through analysis of an image taken by the camera 30 (see FIG. 1).

In the present exemplary embodiment, the body height is a height of a top of a head of a person wearing shoes from a ground surface. Note that the body height need not be strictly a height of a top of a head and may be an approximate height of a head. In this sense, the body height according to present exemplary embodiment encompasses an approximate height of a head.

In FIG. 3, it is assumed that a vein pattern of a hand is used for authentication. Accordingly, an aerial image is formed so that the person who requests authentication sees an image of a right hand. That is, an aerial image is formed so that an image of a back of a right hand is seen from the person who requests authentication.

In FIG. 3, a size of an aerial image formed in a case where the person who requests authentication is an adult is larger than a size of an aerial image formed in a case where the person who requests authentication is a child. This is because a hand of a tall person is larger than a size of a hand of a short person.

Furthermore, in FIG. 3, a height of an aerial image formed in a case where the person who requests authentication is an adult is higher than a height of an aerial image formed in a case where the person who requests authentication is a child. A height at which an aerial image is formed is selected irrespective of an age and a gender. Specifically, a height of an aerial image for a tall person is set higher than a height of an aerial image for a short person.

It is desirable that an aerial image be formed at any height depending on a body height of a person who requests authentication if both of the aerial image forming device 10 and the sensor device for authentication 60 permit such formation of an aerial image at any height. Note that an aerial image is formed at a height at which a person who requests authentication can easily hold his or her open hand in front of him or her. For example, an aerial image is formed close to a height of shoulders of the person who requests authentication. Note that this position close to the height of shoulders of the person who requests authentication is an example, and an aerial image may be formed, for example, above a head, in front of an abdomen, or above a knee of the person.

For example, a person who finds it difficult to raise his or her hand upward, for example, because of an injury or an illness finds it difficult to even raise his or her hand close to a height of shoulders as illustrated in FIG. 3. Meanwhile, in a case where an aerial image is formed at a position above knees, the person can perform authentication just by reversing his or her hand while keeping his or her arms dangling. In this case, an aerial image expressing a hand with fingers pointing to the ground is formed in the air.

Note that body heights of persons may be classified into several groups, and a height at which an aerial image is formed may be set in accordance with a group to which a body height of a person who requests authentication belongs.

Even in a case where the aerial image forming device 10 and the sensor device for authentication 60 can technically permit an aerial image to be formed at any height, the number of heights that are supported by the information processing system 1 is sometimes limited due to various restrictions. For example, in a case where four groups of heights are supported by the information processing system 1, an aerial image is formed at a height corresponding to one of these four groups to which a body height of a person who requests authentication estimated, for example, from an image taken by the camera 30 belongs.

Example 2

Figure 4:
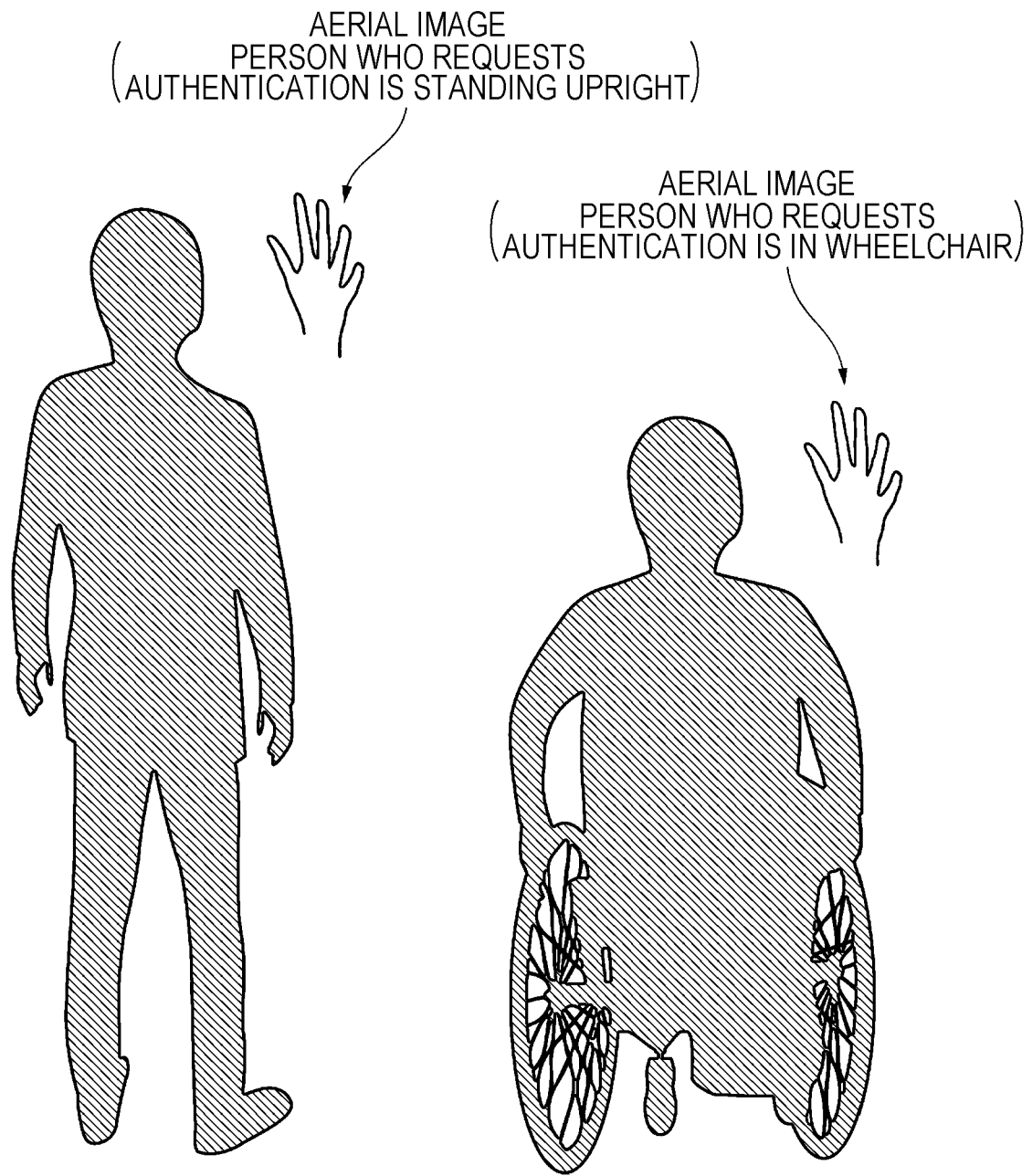
FIG. 4 is a view for explaining a difference between an aerial image formed in a case where a person who requests authentication is in a wheelchair and an aerial image formed in a case where a person who requests authentication is standing upright.

FIG. 4 is a view for explaining a difference between an aerial image formed in a case where a person who requests authentication is in a wheelchair and an aerial image formed in a case where a person who requests authentication is standing upright.

In FIG. 4, it is assumed that both of the person in a wheelchair and the person standing upright are adults although an age group to which a person who requests authentication belongs does not matter in Example 2.

In FIG. 4, even in a case where a person who requests authentication is an adult, if this person is in a wheelchair, an aerial image expressing a hand is formed at a height suitable for persons in wheelchairs. Specifically, the aerial image is formed at a height corresponding to thighs of a standing person. In other words, FIG. 4 illustrates an example in which a height at which an aerial image is formed is controlled in accordance with a height of a head of a person in a wheelchair.

In FIG. 4, the person in the wheelchair is found to be an adult as a result of analysis, and therefore a hand presented as an aerial image around the person in the wheelchair has the same size as a hand presented as an aerial image to a standing adult.

Although the person who requests authentication is in a wheelchair in FIG. 4, a height at which an aerial image is formed may be changed in accordance with a height of a head or a posture of the person who requests authentication as illustrated in FIG. 4 even in a case where the person who requests authentication is sitting in a shopping cart equipped with a seat or is sitting on a chair. The posture is included in characteristics of a body of the person who requests authentication. Examples of the posture include a posture of sitting on a wheelchair, a posture of sitting on a seat or a chair, a posture of bending over, and a posture of standing upright.

Example 3

Figure 5:
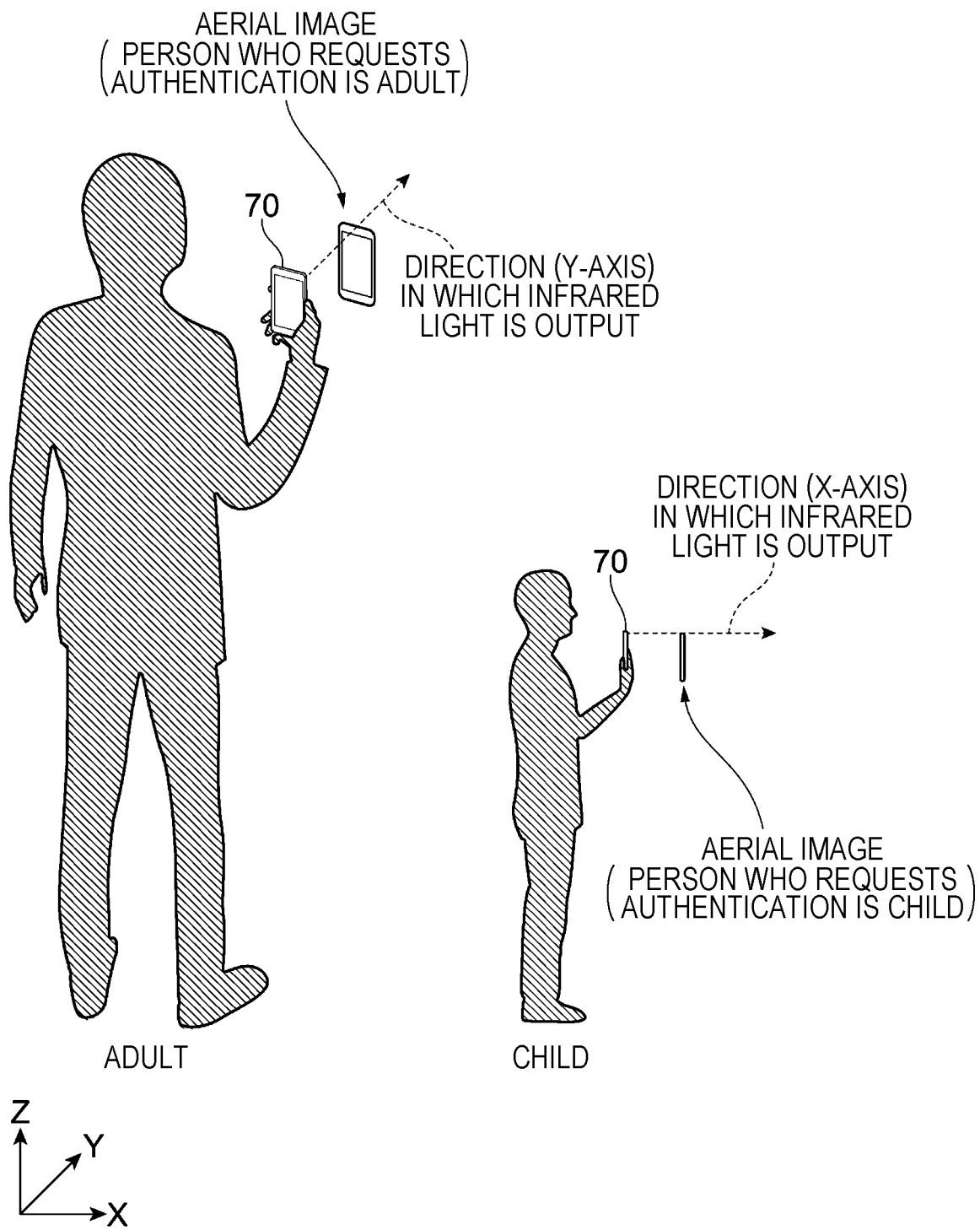
FIG. 5 is a view for explaining an example in which authentication is executed by using an information terminal which a person who requests authentication owns.

FIG. 5 is a view for explaining an example of execution of authentication using an information terminal 70 which a person who requests authentication owns.

In FIG. 5, information used for authentication of a person who requests authentication is transmitted from the information terminal 70 to the communication device 40 (see FIG. 1). In FIG. 5, it is assumed that the information terminal 70 is a smartphone. There is almost no difference in size among smartphones irrespective of differences among persons who request authentication. Accordingly, an aerial image of a smartphone of the same size is formed irrespective of whether a person who requests authentication is an adult or a child.

In FIG. 5, the information terminal 70 and the communication device 40 use infrared light for communication. The infrared communication has directivity, and communication does not succeed unless infrared light is emitted toward a light receiving part of the communication device 40.

In FIG. 5, at least two light receiving parts are provided at different positions although only a single light receiving part may be provided to receive infrared light used for authentication.

For example, in a case where a person who requests authentication is an adult, a light receiving part (not illustrated) is disposed on a line along which the Y-axis extends. In this case, the person who is an adult needs to hold the information terminal 70 so that a light source thereof that outputs infrared light faces a direction indicated by the arrow representing the Y-axis. Accordingly, in a case where the person who requests authentication is an adult, an aerial image is formed in parallel with a plane defined by the X-axis and the Z-axis.

In a case where the person who requests authentication is a child, a light receiving part (not illustrated) is disposed on a line along which the X-axis extends. In this case, the person who is a child needs to hold the information terminal 70 so that a light source thereof that outputs infrared light faces a direction indicated by the arrow representing the X-axis. Accordingly, in a case where the person who requests authentication is a child, an aerial image is formed in parallel with a plane defined by the Y-axis and the Z-axis.

A position where the light receiving part is disposed in a space is specified by a combination among a position within a plane defined by the X-axis and the Y-axis, a height in the Z-axis, and a direction of light reception. A direction in which infrared light is received is defined not only by a direction within the plane defined by the X-axis and the Y-axis, but also by a direction of inclination that is a direction of the Z-axis. For example, plural light receiving parts that are different only in height may be disposed. Alternatively, plural light receiving parts that are different in combination of position and direction of light reception may be disposed. FIG. 5 illustrates an example in which light receiving parts are provided at the same height but are different in position and direction of light reception.

In FIG. 5, a height of an aerial image is controlled in accordance with a body height of a person who requests authentication, as in Example 1. Furthermore, a height at which a person who requests authentication can easily hold the information terminal 70 is selected depending on whether or not the person is sitting on a wheelchair or standing upright, as in Example 2.

Although a height at which an aerial image is formed is controlled in accordance with a body height of a person who requests authentication in the example of FIG. 5, a light receiving part used for authentication may be changed every authentication in a case where plural light receiving parts that can be used for authentication are provided in the space. For example, in a case where authentication of two adults is successively executed, a direction and an inclination of an aerial image expressing an information terminal may be changed every authentication although a height at which the aerial image is formed may remain the same. The same applies to children. Even in a case where authentication of a child is executed after authentication of an adult, aerial images may be formed in different directions and inclinations.

Alternatively, a position and the like where an aerial image is formed may be changed not every authentication but every predetermined number of times of authentication. For example, a position and the like where an aerial image is formed may be changed every time the number of times of authentication becomes a multiple of 5. Note that a cycle on which the position used for authentication is changed may be randomly changed. For example, the position may be changed after authentication is executed three times. Next, the position may be changed after authentication is executed two times. Then, the position may be changed after authentication is executed five times.

In a case where plural persons who request authentication are concurrently present in a place where authentication is executed, an aerial image for guiding the plural persons to a place where authentication is easy may be formed. The place where authentication of plural persons is easy is a place where the persons are spaced apart from each other and are not hidden by each other. In addition, in a case where non-contact communication is used for authentication, the place is a place where this communication is easy.

In a case where plural persons request authentication, as many aerial images as these persons may be formed. For example, in a case where two persons request authentication, two aerial images corresponding to these two persons are formed in the same space. For example, in a case where three persons request authentication, three aerial images corresponding to these three persons are formed in the same space. These plural aerial images formed in the air are formed at positions according to characteristics of bodies of these persons and a situation of a place where authentication is executed.

How frequently a position used for authentication is changed may be changed in accordance with a requested security level. For example, a position used for authentication may be changed more frequently in a case where a higher security level is requested. Furthermore, a position used for authentication may be randomly changed in a case where a high security level is requested. By more frequently changing a position used for authentication, it becomes more difficult to predict a place for authentication, thereby providing a higher security level.

Note that a position used for authentication may be changed at constant time intervals irrespective of the number of times of authentication. For example, a position used for authentication may be changed every hour. Alternatively, a position used for authentication may be changed in accordance with a predetermined schedule irrespective of the number of times of authentication.

Example 4

Figure 6A:
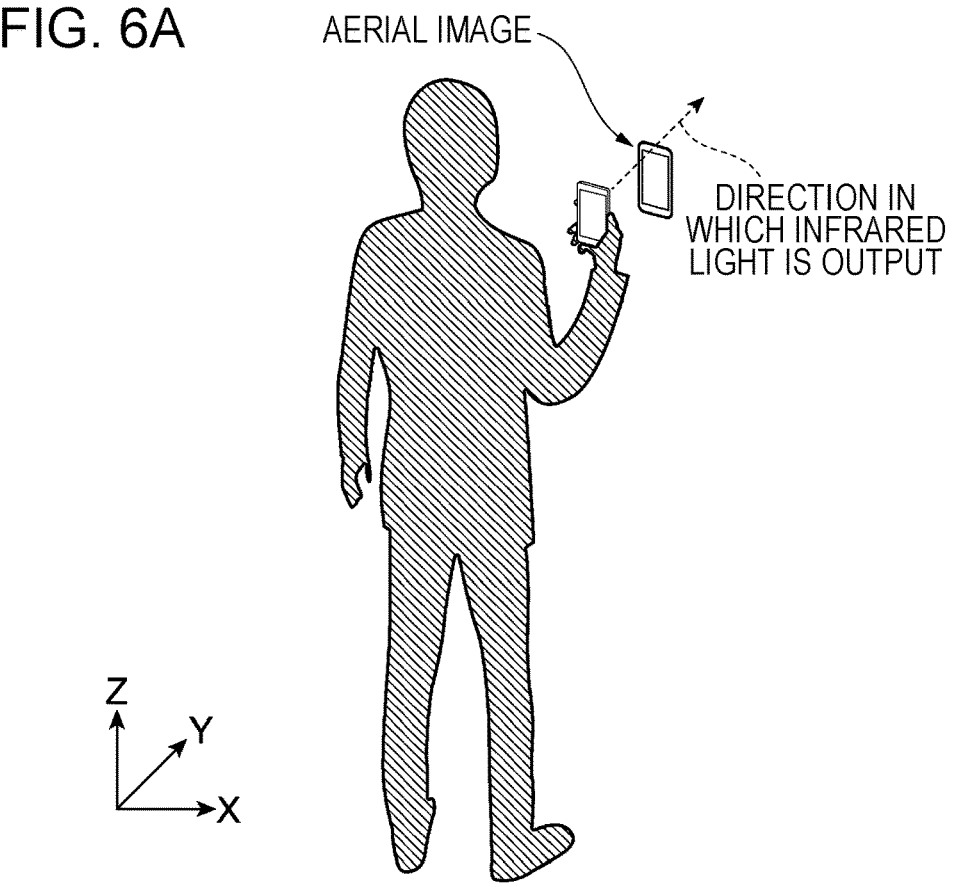
FIGS. 6A and 6B are views for explaining an example in which a position where an aerial image is formed is changed in accordance with a direction of a body of a person who requests authentication.
Figure 6B:
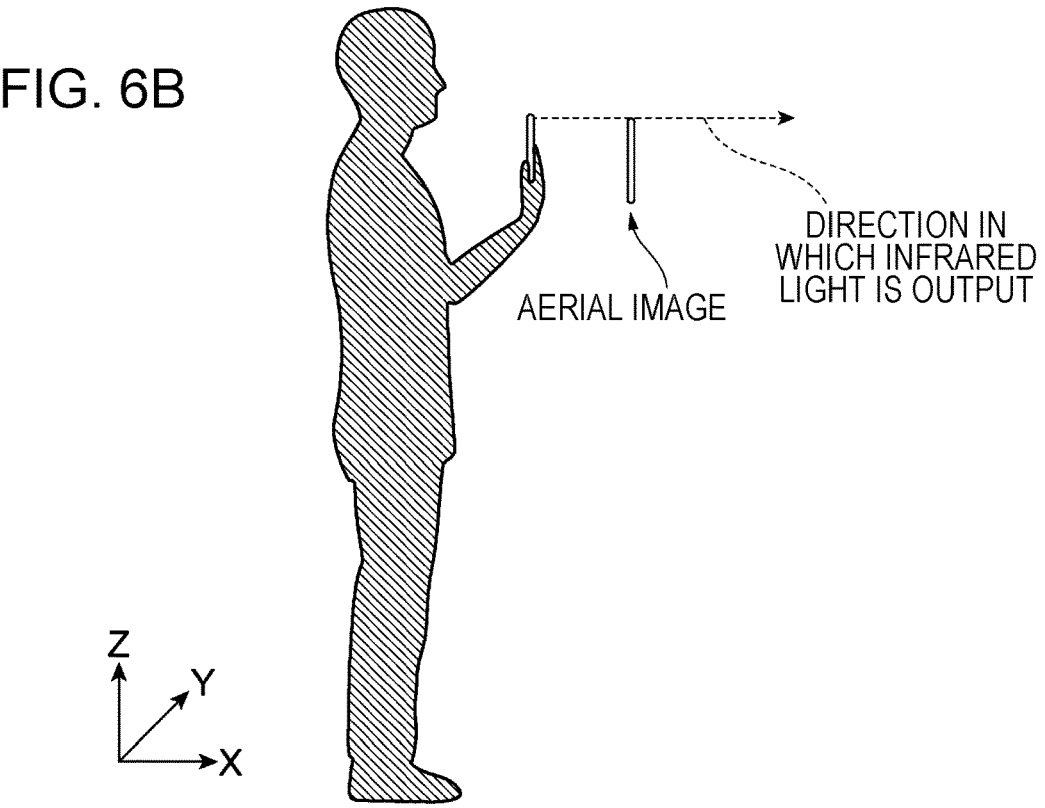

FIGS. 6A and 6B are views for explaining an example in which a position where an aerial image is formed is changed in accordance with a direction of a body of a person who requests authentication. FIG. 6A illustrates a case where a person who requests authentication is gazing in a direction of the Y-axis, and FIG. 6B illustrates a case where a person who requests authentication is gazing in a direction of the X-axis.

In FIG. 6, it is assumed that information used for authentication of a person who requests authentication is transmitted from the information terminal 70 to the communication device 40 (see FIG. 1). Furthermore, it is assumed that the information terminal 70 is a smartphone.

A body height of a person who requests authentication in FIG. 6A and a body height of a person who requests authentication in FIG. 6B are the same. The person who requests authentication in FIG. 6A and the person who requests authentication in FIG. 6B are different in body direction. In this example, an aerial image expressing the information terminal 70 is formed in the air in accordance with a direction of a body of a person who requests authentication. In this case, a person who requests authentication need not change a body direction when performing authentication. Furthermore, a person who has entered a range where authentication can be executed can start authentication without changing a body direction after entering this range.

Although an example in which the information terminal 70 is used for authentication is illustrated in FIGS. 6A and 6B, the aerial image formation in Example 4 can be applied to a case where a part of a body of a person who requests authentication is used for authentication as in Examples 1 and 2.

Example 5

Figure 7A:
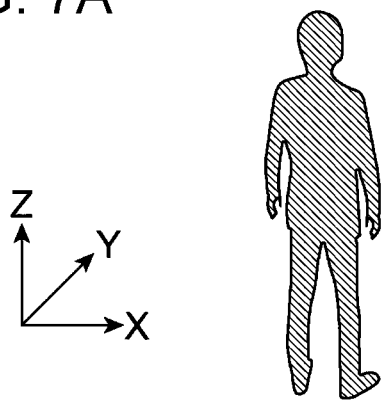
FIGS. 7A through 7C are views for explaining an example of progress of authentication using an aerial image and notification of success of the authentication.
Figure 7B:
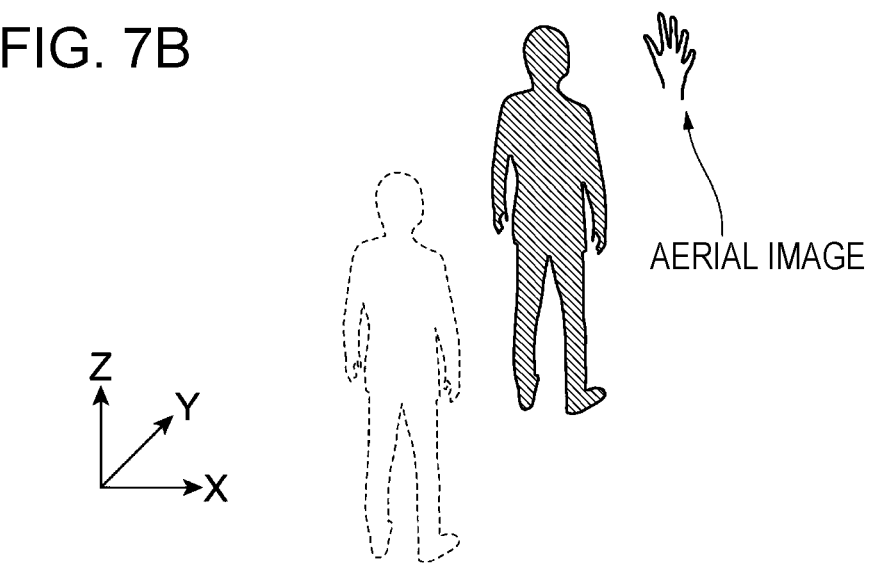
Figure 7C:
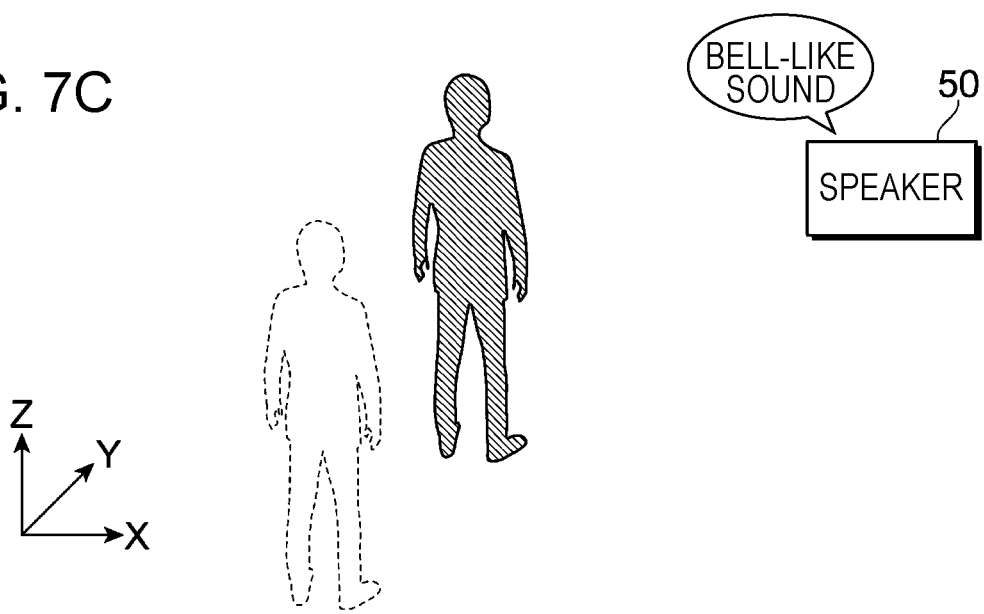

FIGS. 7A through 7C are views for explaining an example of progress of authentication using an aerial image and notification of success of the authentication. FIG. 7A illustrates a state at a time T1 before start of the authentication, FIG. 7B illustrates a state at a time T2 at which formation of an aerial image has started, and FIG. 7C illustrates a state at a time T3 at which the authentication has ended.

At the time T1, a person who requests authentication has not entered a predetermined space for distinguishing a person who requests authentication from others. Accordingly, an aerial image has not been formed yet in the air.

When this person is found to be a person who requests authentication, an aerial image expressing an object or a body part from which information used for authentication is to be acquired is formed around this person as illustrated in FIG. 7B. In the example of FIGS. 7A through 7C, a vein pattern of a right hand is used for authentication, and therefore an aerial image of a right hand is formed in the air. This aerial image is formed in a similar manner to those in Examples 1 to 4.

In the case of FIGS. 7A through 7C, when the person who requests authentication places his or her right hand over the aerial image, a vein pattern is acquired from the right hand, and an authentication process is executed based on the acquired vein pattern. Note that the vein pattern is acquired by the sensor device for authentication 60 (not illustrated, see FIG. 1).

In the case of FIGS. 7A through 7C, the authentication succeeds. Accordingly, bell-like sound is output from the speaker 50 to notify the person about success of the authentication. After the notification using the sound, the aerial image disappears from the air. Since the aerial image disappears from the air, the person visually recognizes the end of the authentication. Note that the sound may be any sound that allows the person to recognize success of the authentication.

Although the aerial image disappears from the air after the sound notification about success of the authentication in the case of FIGS. 7A through 7C, formation of the aerial image may be ended when acquisition of the vein pattern necessary for authentication ends.

Example 6

Figure 8A:
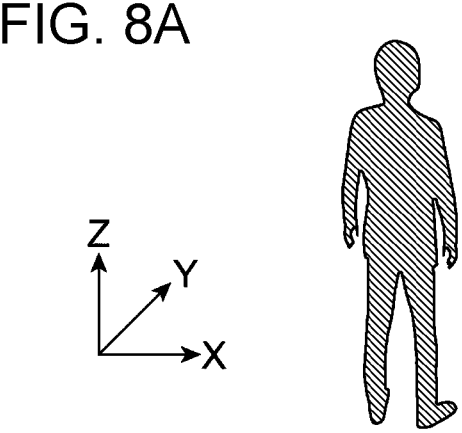
FIGS. 8A through 8C are views for explaining another example of progress of authentication using an aerial image and notification of success of the authentication.
Figure 8B:
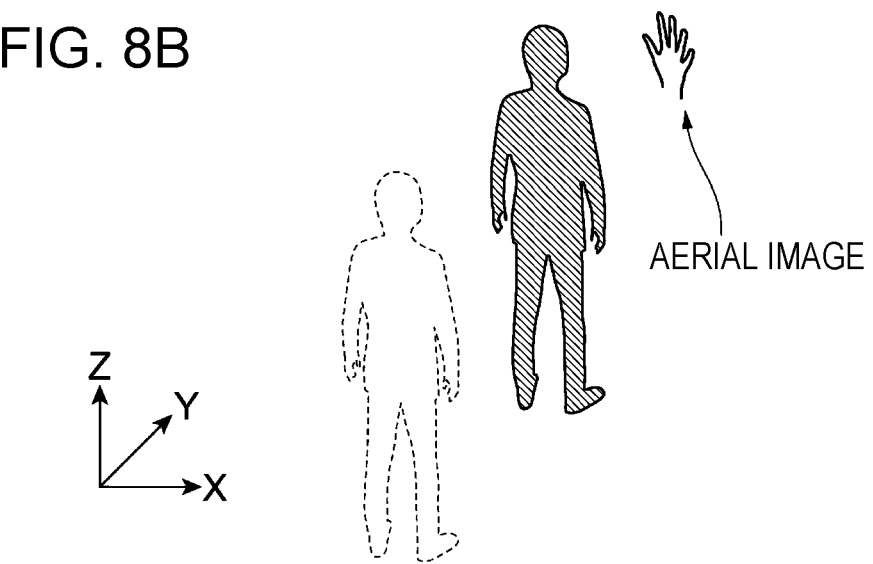
Figure 8C:
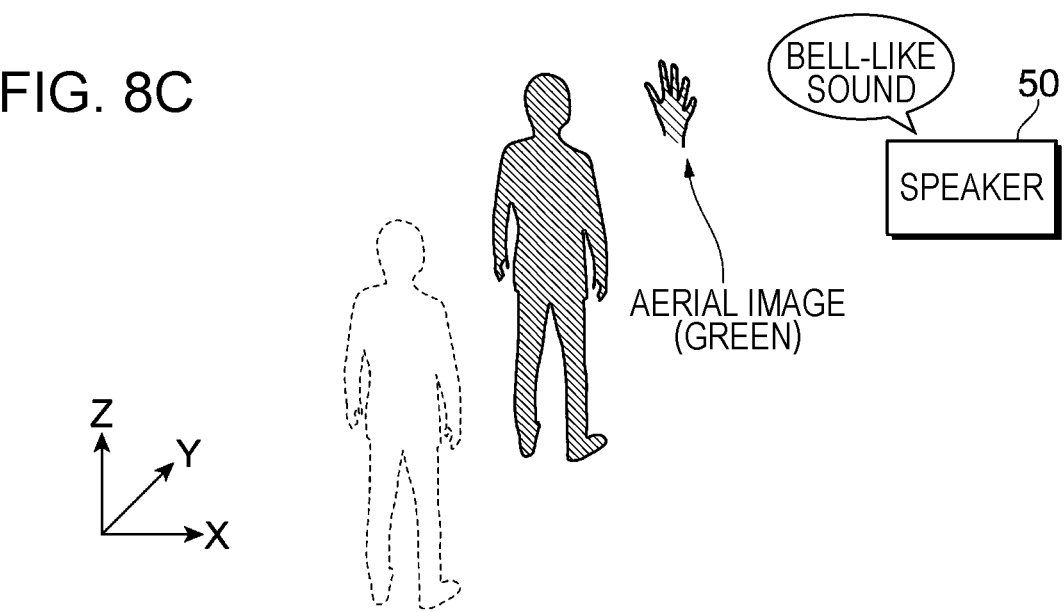

FIGS. 8A through 8C are views for explaining another example of progress of authentication using an aerial image and notification of success of the authentication. FIG. 8A illustrates a state at a time T1 before start of the authentication, FIG. 8B illustrates a state at a time T2 at which formation of an aerial image has started, and FIG. 8C illustrates a state at a time T3 at which the authentication has ended. In FIGS. 8A through 8C, parts corresponding to the parts of FIGS. 7A through 7C are given corresponding reference signs.

The contents at the time T1 and the time T2 in FIGS. 8A and 8B are the same as the contents at the time T1 and the time T2 in FIGS. 7A and 7B.

A difference lies in contents at the time T3. In the case of FIGS. 8 through 8C, a person is notified about success of authentication not only by sound but also by a change in color of an aerial image. In the example illustrated in FIGS. 8A through 8C, a color of an aerial image expressing a right hand changes to green, and thus the person is notified about success of authentication. In this case, the person can recognize success of authentication not only by sound but also visually. Note that the color used to notify the person about success of authentication is an example and may be, for example, blue. Note that the aerial image whose color has changed to green disappears from the air after elapse of a predetermined period.

Example 7

Figure 9A:
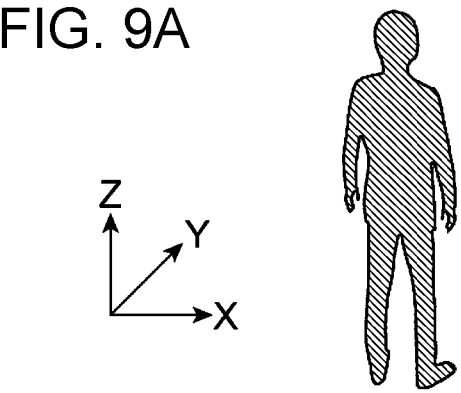
FIGS. 9A through 9C are views for explaining another example of progress of authentication using an aerial image and notification of success of the authentication.
Figure 9B:
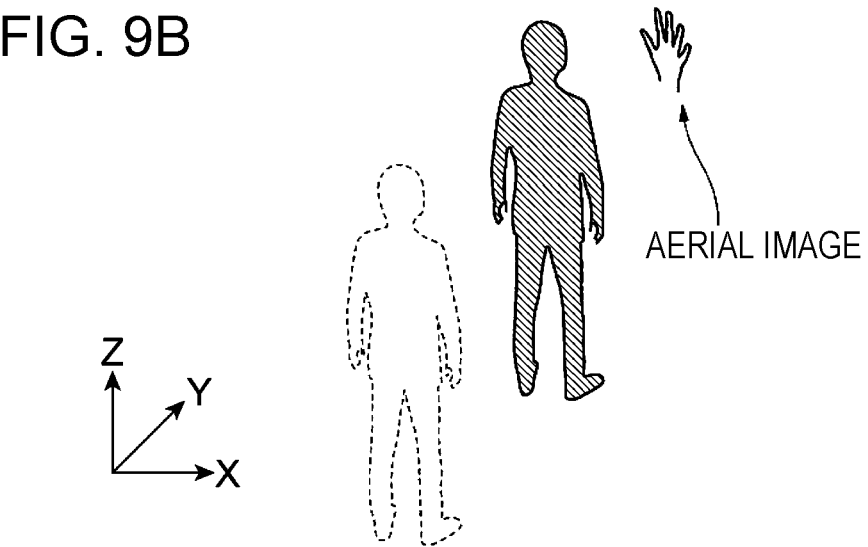
Figure 9C:
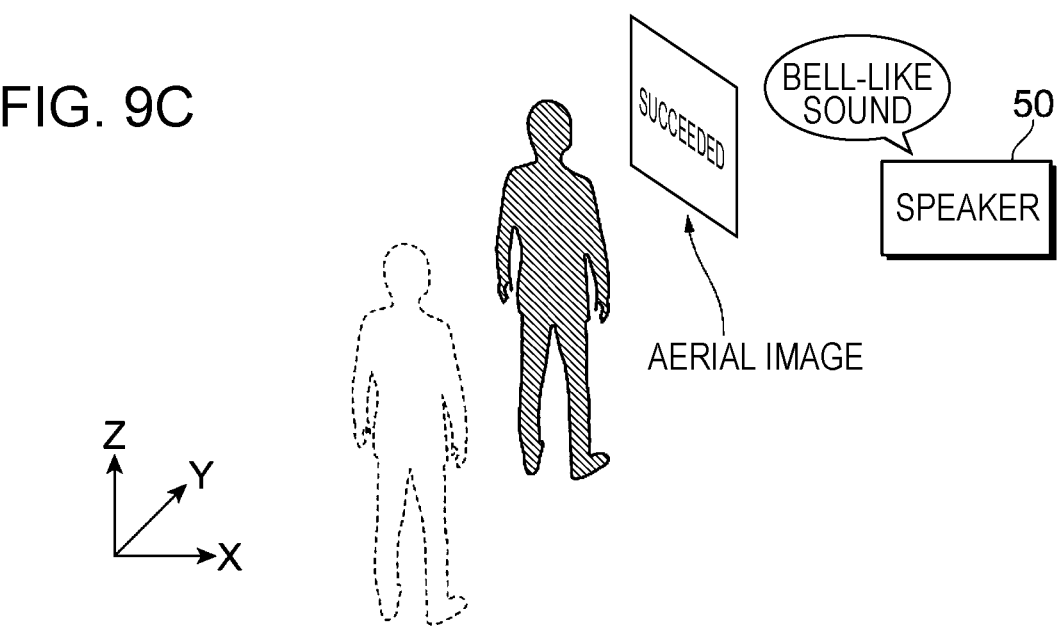

FIGS. 9A through 9C are views for explaining another example of progress of authentication using an aerial image and notification of success of the authentication. FIG. 9A illustrates a state at a time T1 before start of the authentication, FIG. 9B illustrates a state at a time T2 at which formation of an aerial image has started, and FIG. 9C illustrates a state at a time T3 at which the authentication has ended. In FIGS. 9A through 9C, parts corresponding to the parts of FIGS. 7A through 7C are given corresponding reference signs.

The contents at the time T1 and the time T2 in FIGS. 9A and 9B are the same as the contents at the time T1 and the time T2 in FIGS. 7A and 7B.

A difference lies in contents at the time T3. In the case of FIGS. 9A through 9C, a person is notified about success of authentication not only by sound but also by an aerial image that contains a character string indicative of success of authentication. In the example illustrated in FIGS. 9A through 9C, an aerial image expressing a right hand changes to a plate-shaped aerial image showing a text "SUCCEEDED" when the authentication succeeds.

In this example, the person can recognize success of authentication not only by sound but also by a text. Note that the aerial image showing the text disappears from the air after elapse of a predetermined period.

Example 8

Figure 10A:
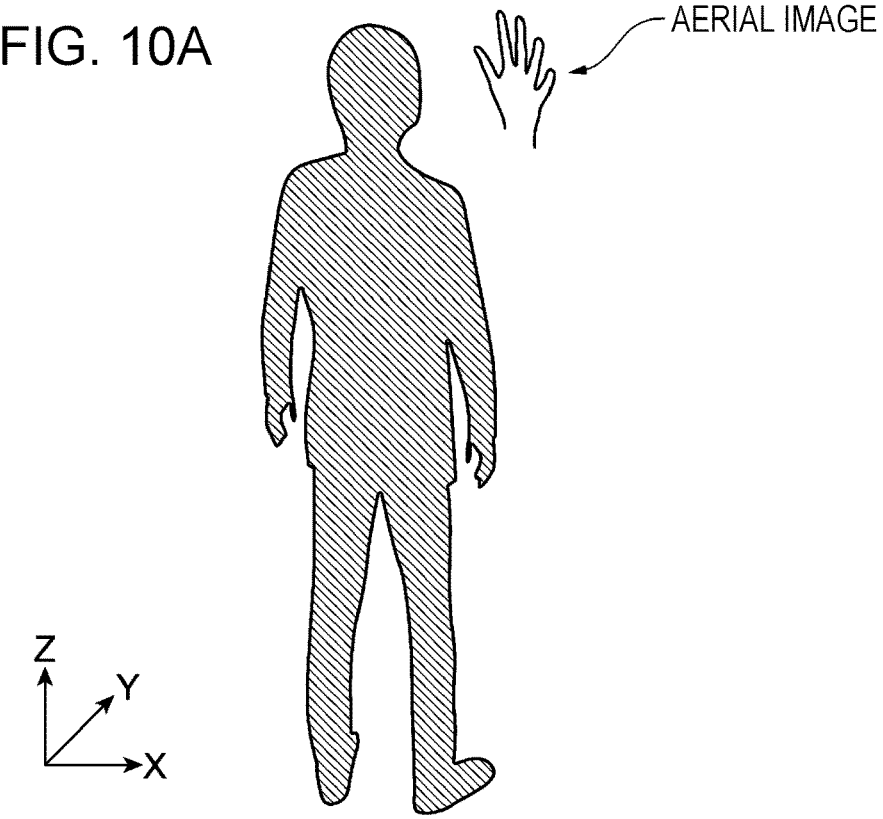
FIGS. 10A and 10B are views for explaining an example of progress of authentication using an aerial image and notification of failure of the authentication.
Figure 10B:
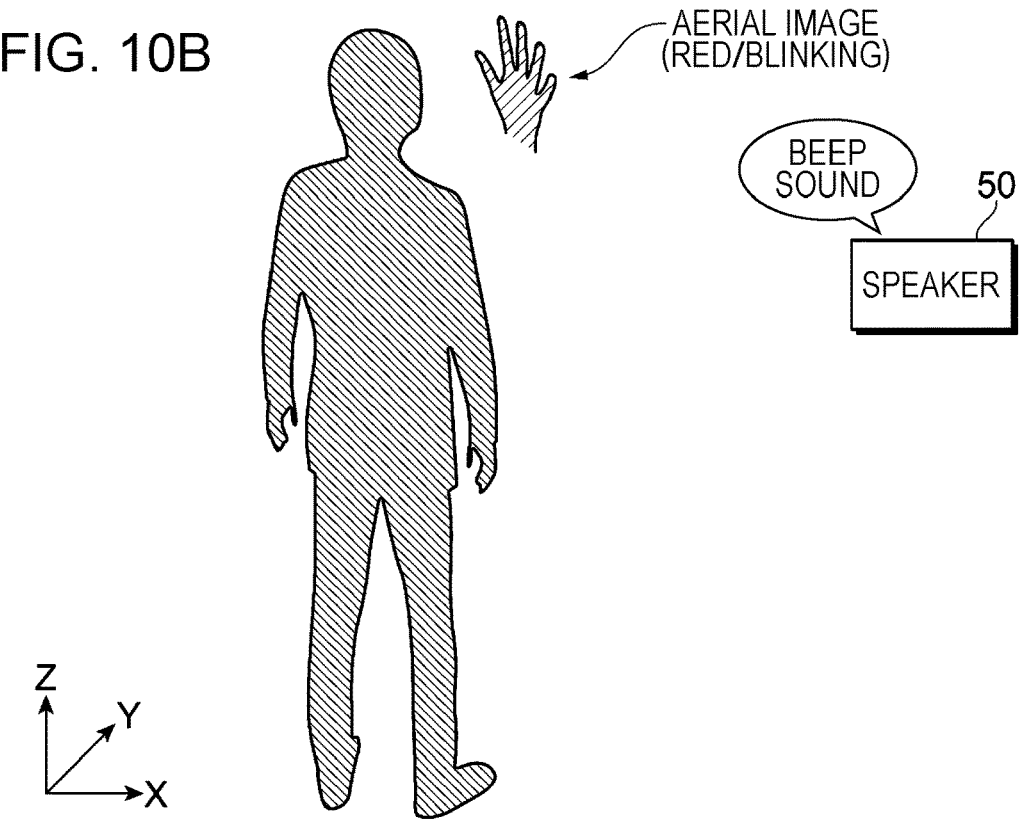

FIGS. 10A and 10B are views for explaining an example of progress of authentication using an aerial image and notification of failure of the authentication. FIG. 10A illustrates a state at a time T2 at which formation of an aerial image has started, and FIG. 10B illustrates a state at a time T3 at which the authentication has ended. In FIGS. 10A and 10B, parts corresponding to the parts of FIGS. 7A through 7C are given corresponding reference signs.

In FIGS. 10A and 10B, description of the time T1 is omitted, and description starts from the time T2. The contents at the time T2 in FIG. 10A is the same as the contents at the time T2 in FIG. 7B.

A difference lies in that the authentication fails in the example illustrated in FIGS. 10A and 10B. Accordingly, beep sound is output from the speaker 50 at the time T3 in FIG. 10B. This sound is different from the sound output in a case where authentication succeeds. A person who hears the beep sound recognizes that the authentication has failed. Note that the sound may be any sound that allows a person to recognize failure of authentication.

In the example illustrated in FIGS. 10A and 10B, a person is notified about failure of authentication not only by sound but also by a change in color of an aerial image. In the example illustrated in FIGS. 10A and 10B, a color of an aerial image expressing a back of a right hand changes to red, and thus the person is notified about failure of authentication. In this example, the person recognizes failure of authentication not only by sound but also visually. Note that the color used to notify the person about failure of authentication is an example and may be, for example, black. The aerial image whose color has changed to red disappears from the air after elapse of a predetermined period.

Example 9

Figure 11A:
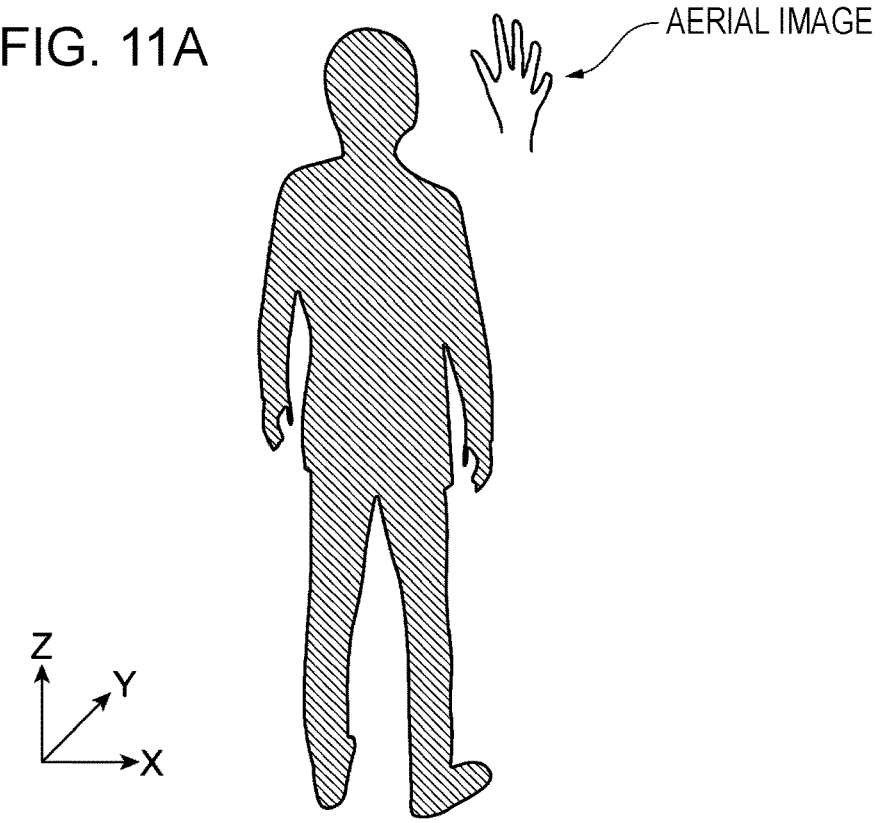
FIGS. 11A and 11B are views for explaining another example of progress of authentication using an aerial image and notification of failure of the authentication.
Figure 11B:
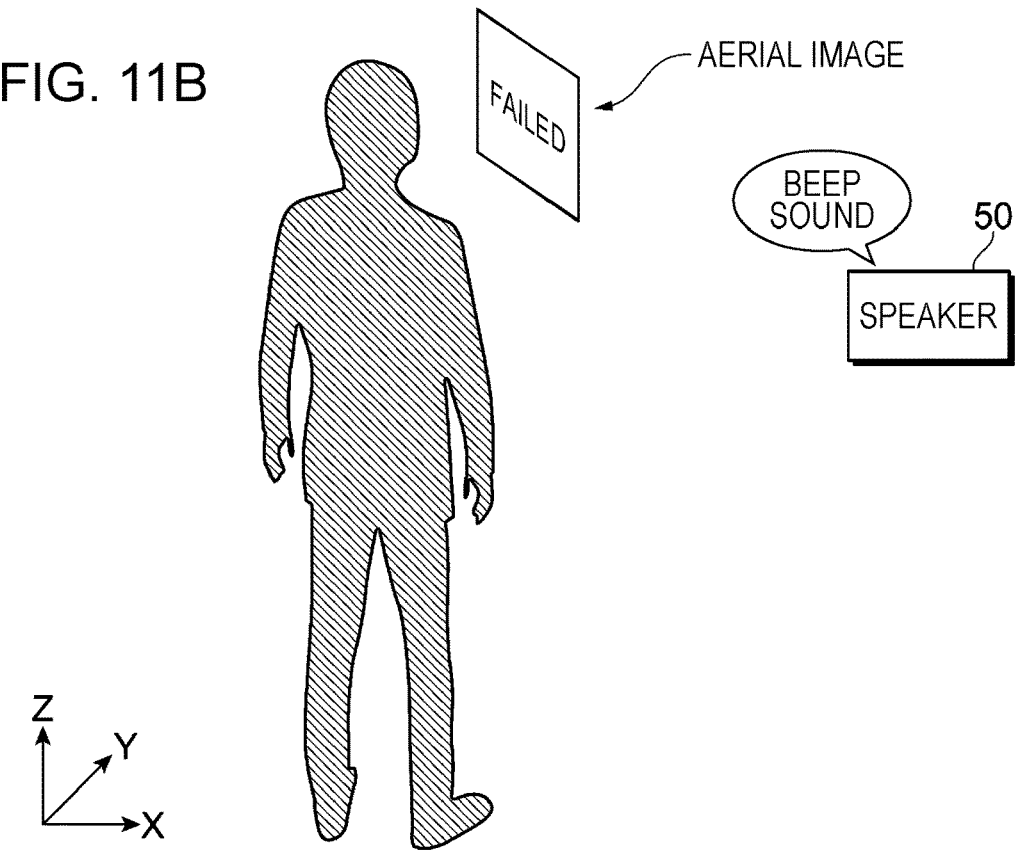

FIGS. 11A and 11B are views for explaining another example of progress of authentication using an aerial image and notification of failure of the authentication. FIG. 11A illustrates a state at a time T2 at which formation of an aerial image has started, and FIG. 11B illustrates a state at a time T3 at which the authentication has ended. In FIGS. 11A and 11B, parts corresponding to the parts of FIGS. 10A and 10B are given corresponding reference signs.

The contents at the time T2 in FIG. 11A is the same as the contents at the time T2 in FIG. 10A.

A difference lies in the contents at the time T3. In the example illustrated in FIGS. 11A and 11B, a person is notified about failure of authentication not only by sound but also by an aerial image containing a character string indicative of failure of authentication. In the example illustrated in FIGS. 11A and 11B, an aerial image expressing a back of a right hand changes to a plate-shaped aerial image showing a text "FAILED" when the authentication fails.

In this example, the person recognizes failure of authentication not only by sound but also by a text. Note that the aerial image showing the text disappears from the air after elapse of a predetermined period.

Example 10

Figure 12A:
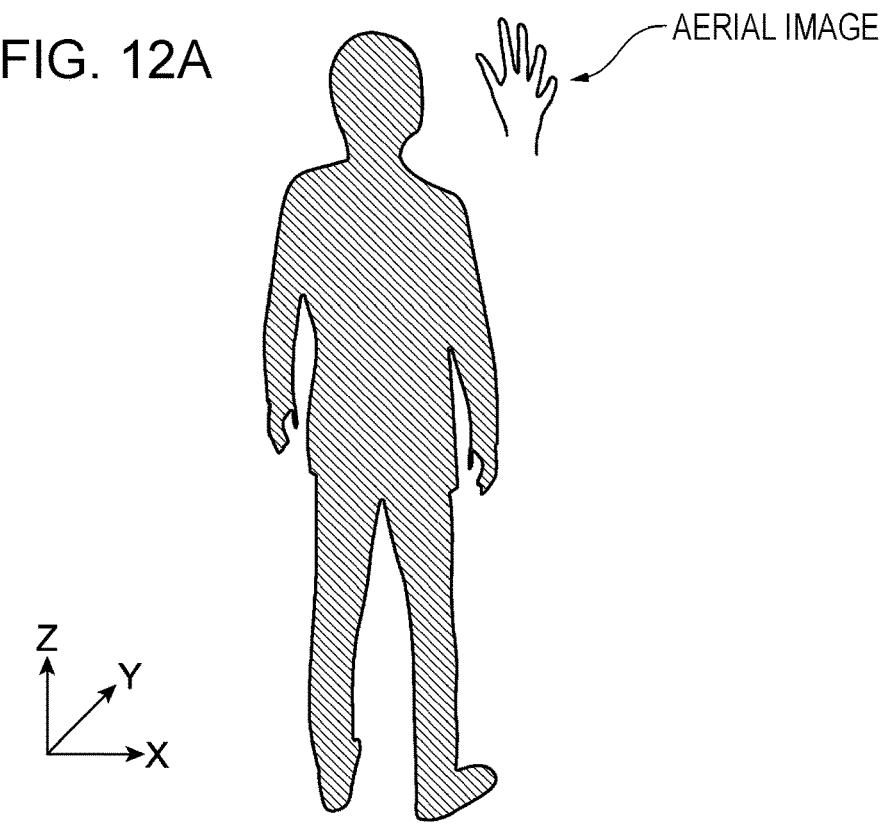
FIGS. 12A and 12B are views for explaining another example of progress of authentication using an aerial image and notification of failure of the authentication.
Figure 12B:
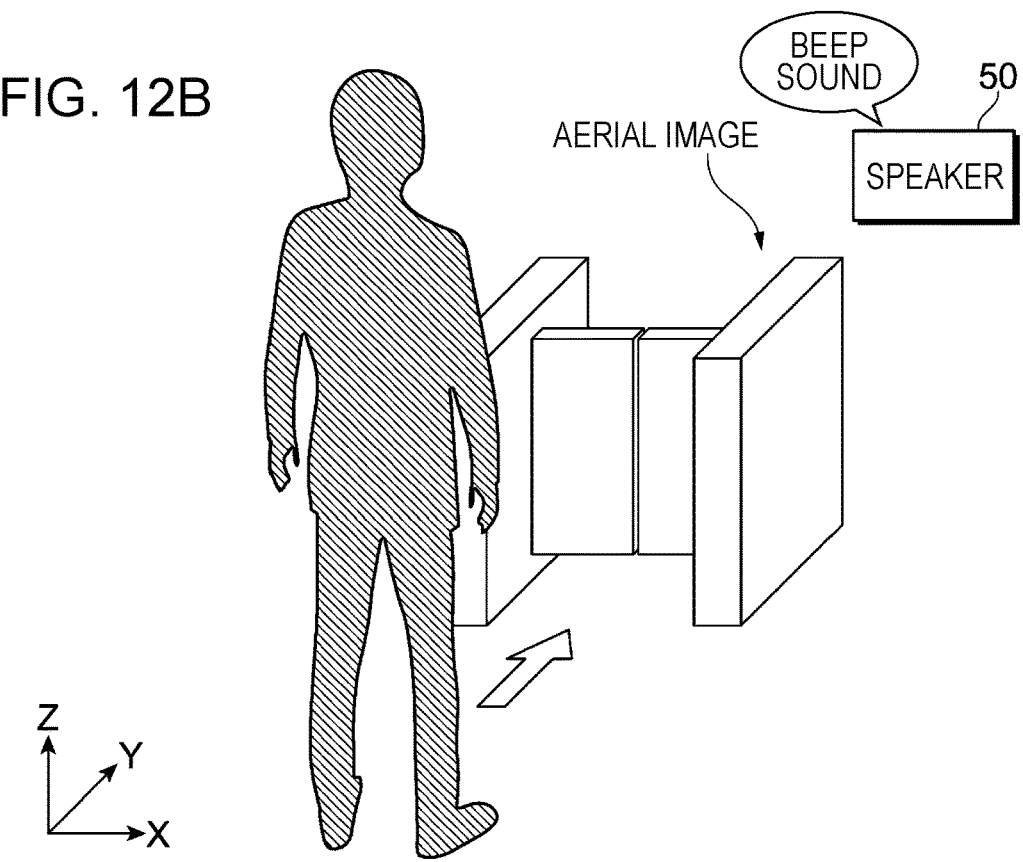

FIGS. 12A and 12B are views for explaining another example of progress of authentication using an aerial image and notification of failure of the authentication. FIG. 12A illustrates a state at a time T2 at which formation of an aerial image has started, and FIG. 12B illustrates a state at a time T3 at which the authentication has ended. In FIGS. 12A and 12B, parts corresponding to the parts of FIGS. 10A and 10B are given corresponding reference signs.

A difference lies in the contents at the time T3. In the example illustrated in FIGS. 12A and 12B, a person is notified about failure of authentication not only by sound but also by an aerial image indicative of failure of authentication. In the example illustrated in FIGS. 12A and 12B, an aerial image expressing a closed door is formed in front of the person. The person who sees the closed door visually recognizes that the authentication has failed, like he or she is stopped by an automated ticket gate in daily life.

Note that the image used to notify the person about failure of authentication is an example and may be, for example, an aerial image expressing a cliff or a broken bridge. Alternatively, the image may be an aerial image that makes a person pause such as a puddle of water or a river or a muddy road crossing in front of the person. Alternatively, the image may be an image of a dangerous animal.

A person who sees, for example, a cliff or a broken bridge stops by instinct and recognizes failure of authentication. The same applies to a person who sees a puddle of water, a dangerous animal, or the like. Note that a person may be notified about failure of authentication by using a moving image.

Note that formation of an aerial image illustrated in the example of FIGS. 12A and 12B is applicable to a notification given in a case where authentication succeeds. For example, a moving aerial image showing a door opening may be formed in a case where authentication has succeeded. A person who sees a moving image showing a door opening visually recognizes that authentication has succeeded. Alternatively, a moving aerial image showing a door being unlocked and opening or a moving aerial image showing a lid opening may be formed in the air. Needless to say, a still image may be used as in the case where a person is notified about failure of authentication.

Example 11

A haptic stimulus may be used to notify a person about success or failure of authentication. In a case where a haptic stimulus is used for the notification, an ultrasound haptic interface device is connected to the control apparatus 20 (see FIG. 1). The ultrasound haptic interface device is constituted by an ultrasound oscillator array including a large number of ultrasound oscillators arranged in a grid-like pattern. The ultrasound haptic interface device generates ultrasonic waves so that the ultrasonic waves form a focal point on a body of a person who requests authentication. When the ultrasound oscillator array operates, a pressure called an acoustic radiation pressure is generated in a specific region where the ultrasonic waves are concentrated. As a result, a haptic stimulus that gives a feeling of being pressed is generated at a position where the acoustic radiation pressure is generated. By changing an intensity and a pattern of this haptic stimulus depending on whether authentication has succeeded or failed, a person can be notified about a result of authentication without need to use sound or an aerial image.

Second Exemplary Embodiment

Next, a second exemplary embodiment is described. A system configuration used in the second exemplary embodiment is similar to that in the first exemplary embodiment. That is, an information processing system 1 (see FIG. 1) is used.

In the first exemplary embodiment, characteristics of a body of a person who requests authentication are acquired from an image taken by the camera 30 (see FIG. 1). Meanwhile, in the present exemplary embodiment, information on an environment of a place where authentication is executed is acquired.

Figure 13:
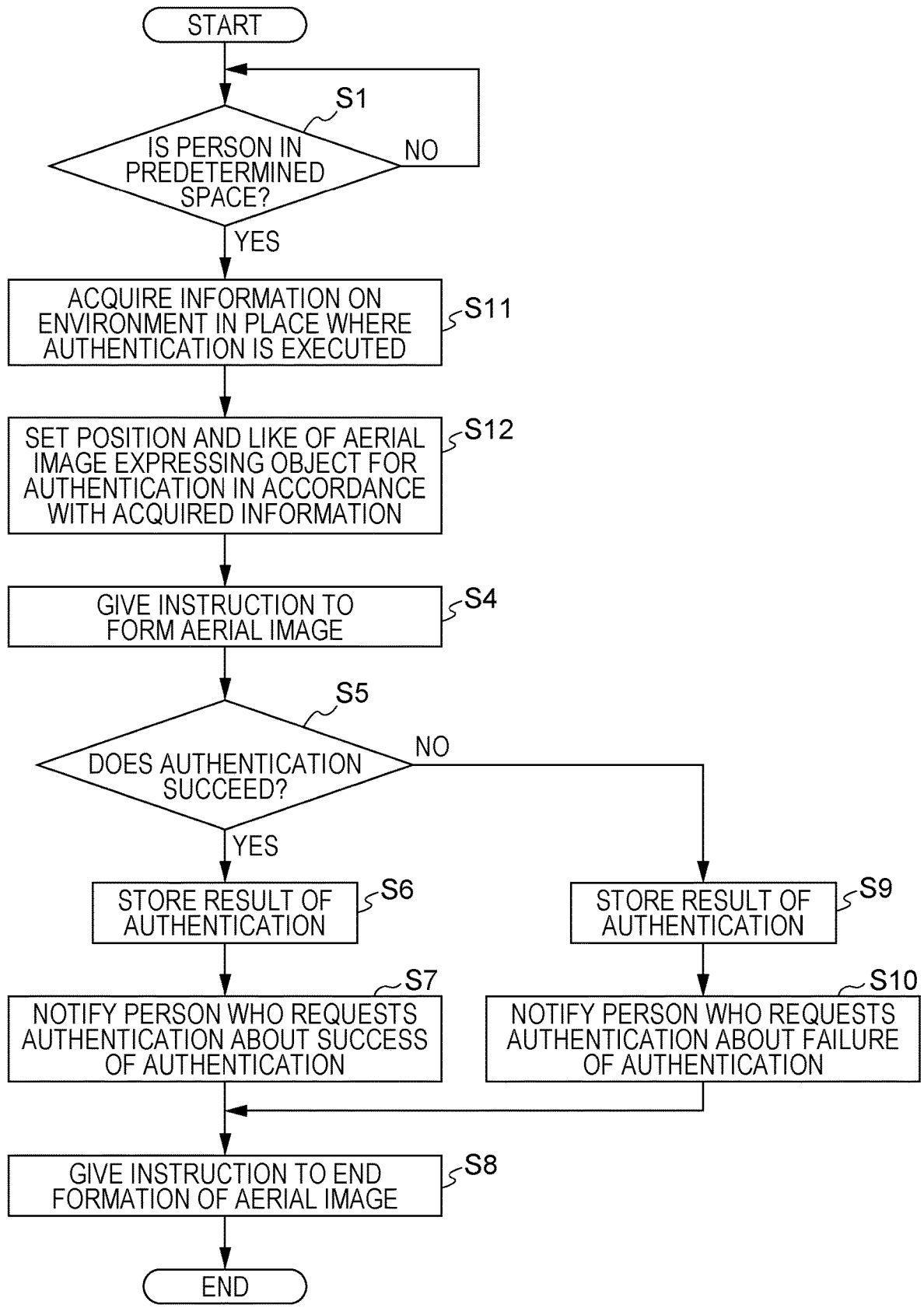
FIG. 13 is a flowchart for explaining a procedure of an authentication process executed in the second exemplary embodiment.

FIG. 13 is a flowchart for explaining a procedure of an authentication process executed in the second exemplary embodiment. The process illustrated in FIG. 13 is realized by execution of a program by a processor 21 (see FIG. 1). In FIG. 13, parts corresponding to those in FIG. 2 are given corresponding reference signs.

First, the processor 21 determines whether or not a person is in a predetermined space (step 1). The processor 21 repeats the determination in step 1 while a negative result is being obtained in step 1.

In a case where a positive result is obtained in step 1, the processor 21 acquires information on an environment of a place where authentication is executed (step 11). In the present exemplary embodiment, the processor 21 acquires, as the information on the environment of the place where authentication is executed, information such as whether or not there is an obstacle that hinders formation of an aerial image or acquisition of information used for authentication. Examples of the obstacle include an object (e.g., a signboard or a display) that is temporarily placed and a person other than a person who requests authentication.

In a case where such an obstacle is present, a space where an aerial image can be formed may be undesirably restricted. Even if the space where an aerial image can be formed is not restricted, a position in the space where information used for authentication can be acquired by a communication device 40 (see FIG. 1) or a sensor device for authentication 60 (see FIG. 1) may be undesirably restricted.

In the present exemplary embodiment, the processor 21 acquires information on an obstacle that may hinder authentication, for example, through analysis of an image taken by the camera 30.

Note that a method for acquiring information on an obstacle is not limited to image analysis. For example, an obstacle may be detected by using a sensor mounted in the place where authentication is executed.

When the information on the environment of the place where authentication is executed is acquired, the processor 21 sets a position and the like where an aerial image expressing an object for authentication is formed in accordance with the acquired information (step 12). The object for authentication may be a specific part of a body of a person who requests authentication or may be an information terminal which the person who requests authentication carries as in the first exemplary embodiment.

In the present exemplary embodiment, an aerial image is formed in a space that is not affected by an obstacle that hinders authentication. Note that the position and the like where an aerial image is formed may be set for convenience of the person who requests authentication if possible by also taking into consideration information on characteristics of a body of the person who requests authentication as in the first exemplary embodiment.

When settings of the position and the like where an aerial image is formed are completed, the processor 21 instructs an aerial image forming device 10 (see FIG. 1) to form an aerial image (step 4). Contents in step 4 and the subsequent steps are similar to those in the first exemplary embodiment.

Figure 14A:
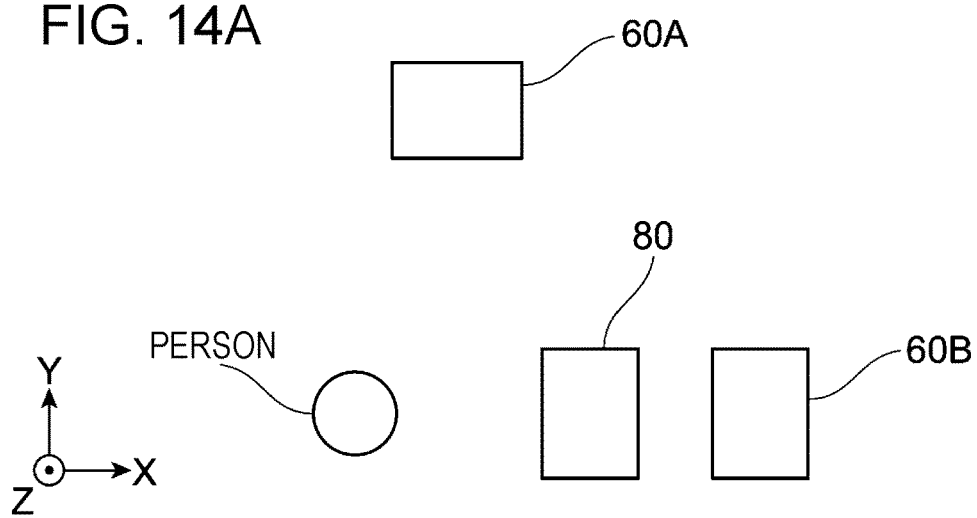
FIGS. 14A and 14B are views for explaining an aerial image formed in a case where an obstacle is present in a place where authentication is executed.
Figure 14B:
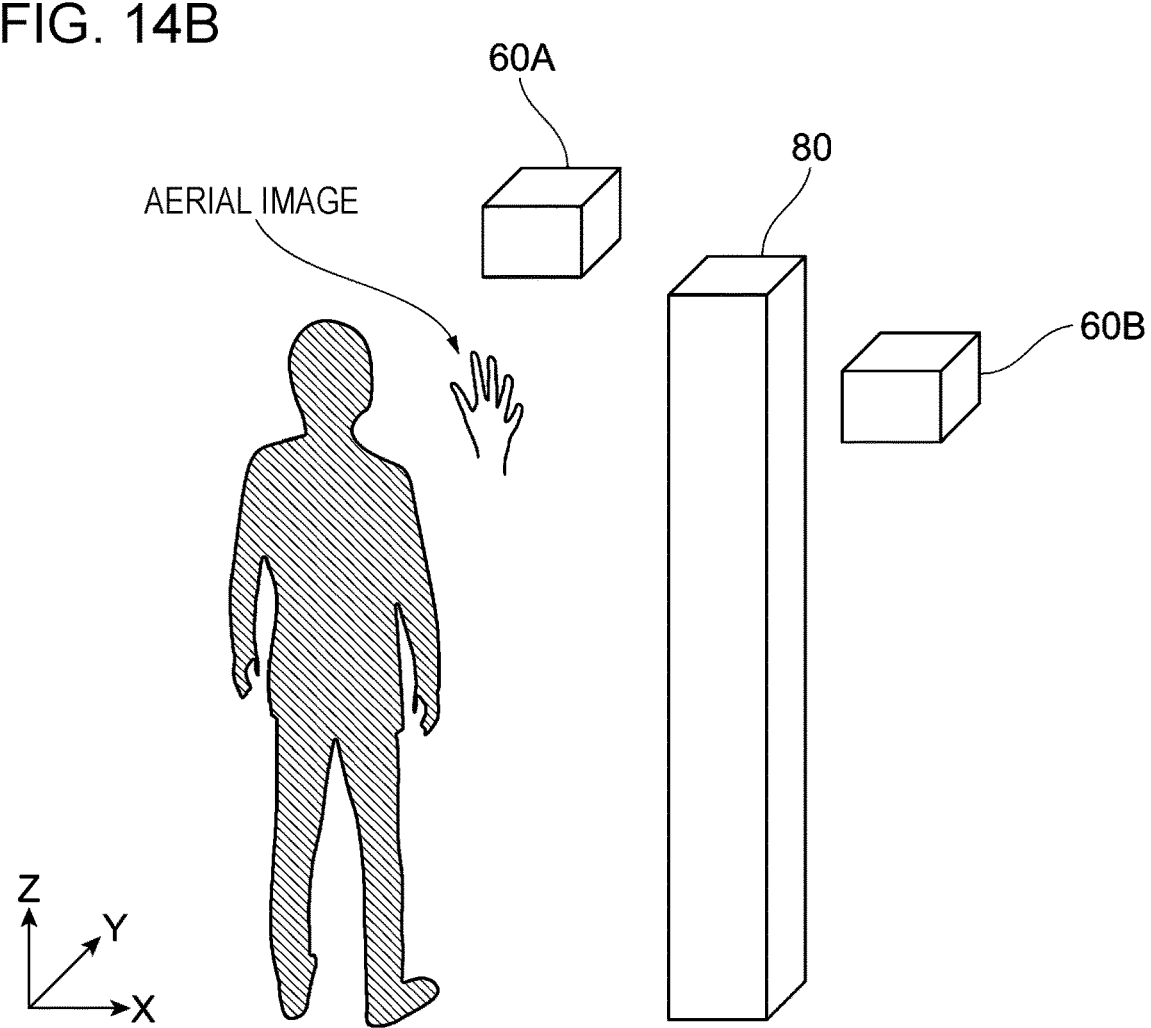

FIGS. 14A and 14B are views for explaining an aerial image formed in a case where an obstacle is present in a place where authentication is executed. FIG. 14A is a plan view of the place where authentication is executed and illustrates a positional relationship among a person who requests authentication and sensor devices for authentication 60A and 60B, and FIG. 14B illustrates an example of an aerial image formed in consideration of an obstacle 80.

In FIGS. 14A and 14B, it is assumed that two sensor devices for authentication 60A and 60B are provided in the place where authentication is executed and that an obstacle 80 is present between the person who requests authentication and the sensor device for authentication 60B. In this example, it is physically impossible to acquire information used for authentication by using the sensor device for authentication 60B.

In view of this, in FIGS. 14A and 14B, the sensor device for authentication 60A that is not affected by the obstacle 80 is used for authentication. Accordingly, in FIGS. 14A and 14B, an aerial image expressing a right hand is formed between the person who requests authentication and the sensor device for authentication 60A. When the person who requests authentication places his or her hand over the aerial image, a vein pattern is read by the sensor device for authentication 60A, and authentication is executed based on the vein pattern by the processor 21 (see FIG. 1).

Figure 15A:
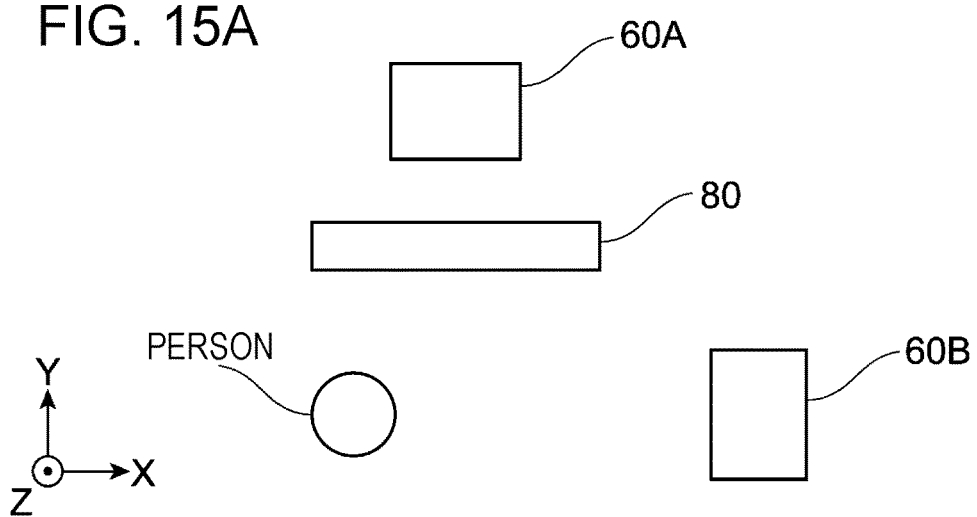
FIGS. 15A and 15B are views for explaining another example of an aerial image formed in a case where an obstacle is present in a place where authentication is executed.
Figure 15B:
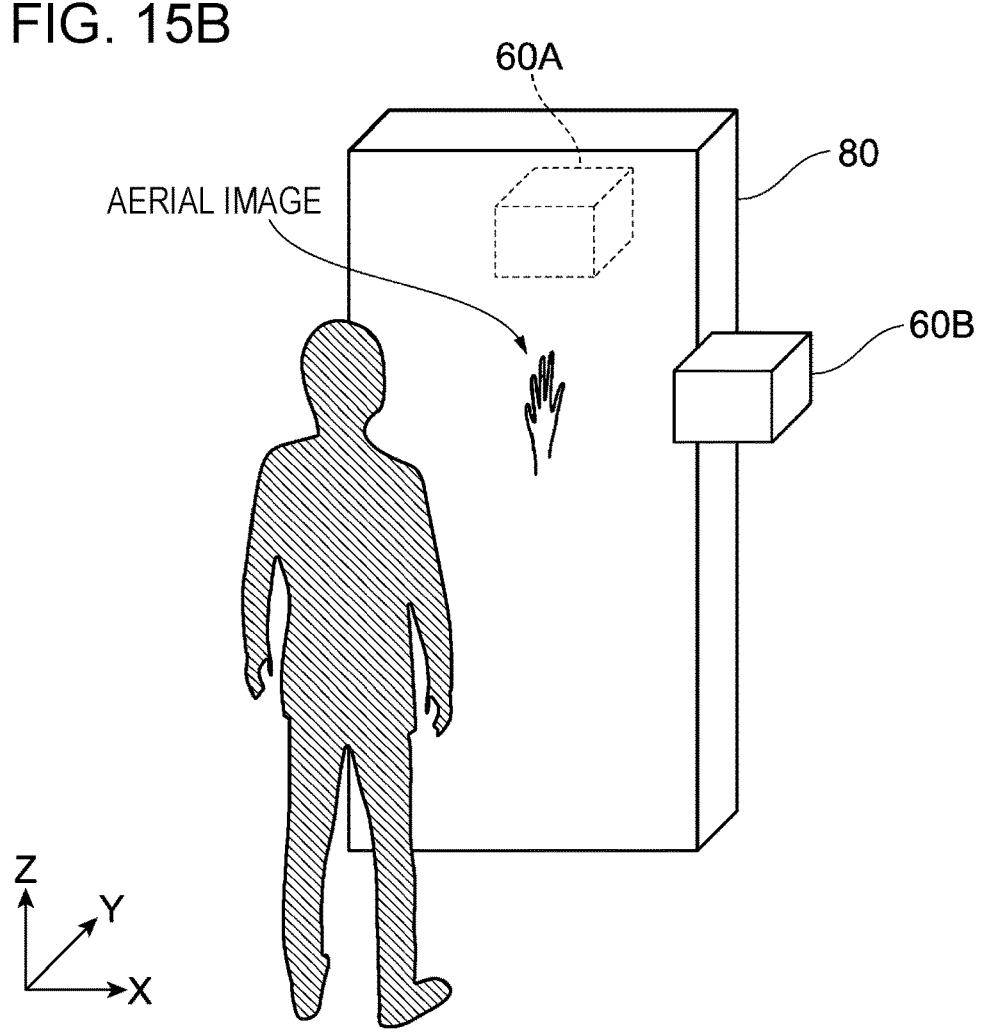

FIGS. 15A and 15B are views for explaining another example of an aerial image formed in a case where an obstacle is present in a place where authentication is executed. FIG. 15A is a plan view of the place where authentication is executed and illustrates a positional relationship among a person who requests authentication and the sensor devices for authentication 60A and 60B, and FIG. 15B illustrates an example of an aerial image formed in consideration of the obstacle 80. In FIGS. 15A and 15B, parts corresponding to those in FIGS. 14A and 14B are given corresponding reference signs.

Also in FIGS. 15A and 15B, the two sensor devices for authentication 60A and 60B are present in the place where authentication is executed. However, in FIGS. 15A and 15B, the obstacle 80 is present between the person who requests authentication and the sensor device for authentication 60A. In this example, it is physically impossible to acquire information used for authentication by using the sensor device for authentication 60A.

In view of this, in FIGS. 15A and 15B, the sensor device for authentication 60B that is not affected by the obstacle 80 is used for authentication. Accordingly, in FIGS. 15A and 15B, an aerial image expressing a right hand is formed between the person who requests authentication and the sensor device for authentication 60B.

Third Exemplary Embodiment

Next, a third exemplary embodiment is described. A system configuration used in the third exemplary embodiment is similar to that in the first exemplary embodiment. That is, an information processing system 1 (see FIG. 1) is used.

In the third exemplary embodiment, information on a level of security requested for authentication is used as a situation in a place where authentication is executed.

Figure 16:
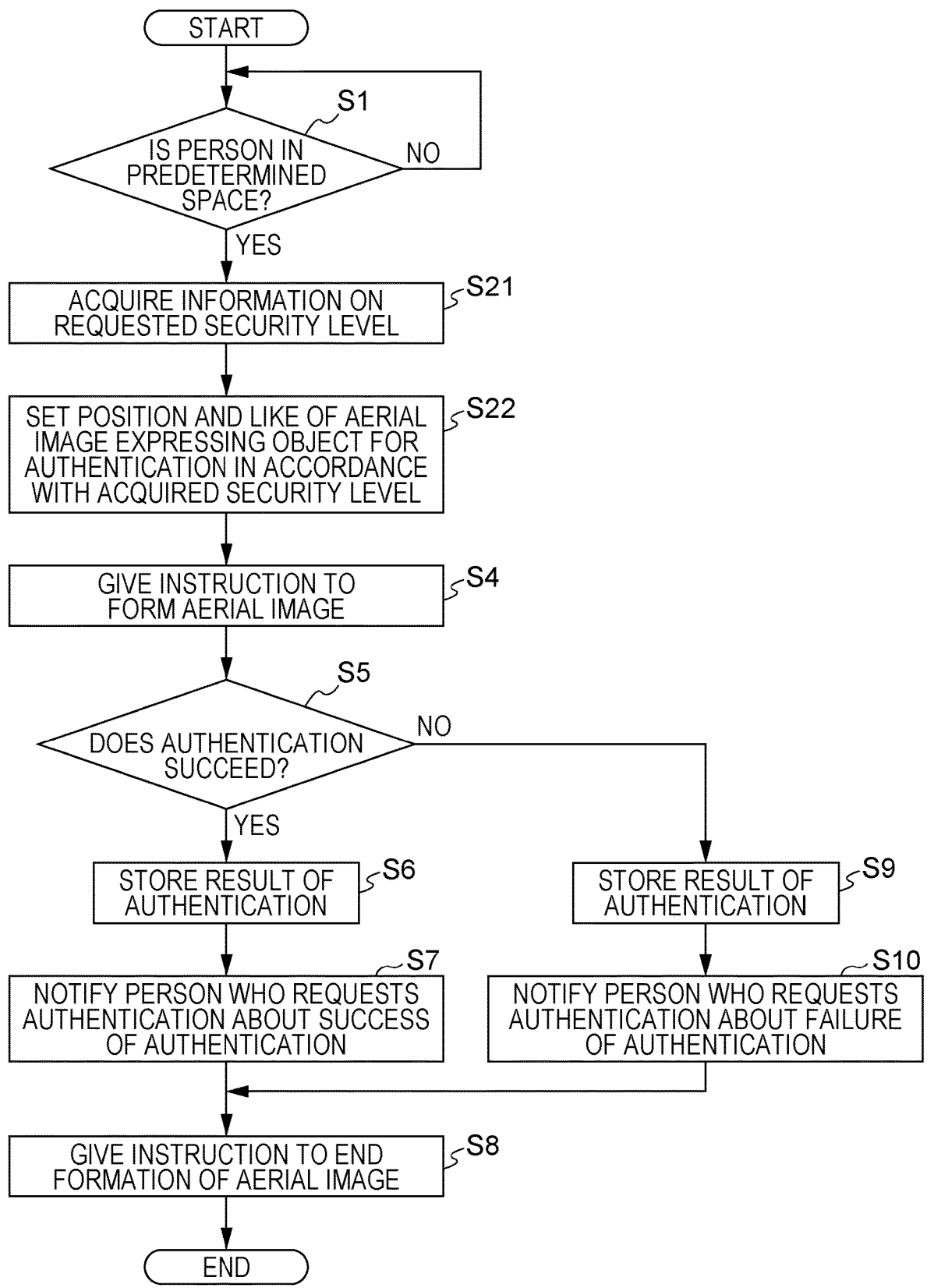
FIG. 16 is a flowchart for explaining a procedure of an authentication process executed in the third exemplary embodiment.

FIG. 16 is a flowchart for explaining a procedure of an authentication process executed in the third exemplary embodiment. The process illustrated in FIG. 16 is realized by execution of a program by a processor 21 (see FIG. 1). In FIG. 16, parts corresponding to those in FIG. 2 are given corresponding reference signs.

First, the processor 21 determines whether or not a person is in a predetermined space (step 1). The processor 21 repeats the determination in step 1 while a negative result is being obtained in step 1.

In a case where a positive result is obtained in step 1, the processor 21 acquires information on a requested security level (step 21). For example, the security level is selected from among several levels. For example, the security level is selected from among "low", "medium", and "high". In the present exemplary embodiment, the security level influences change of a position where an aerial image is formed. For example, in a case where the security level is high, the position is more frequently changed. Furthermore, in a case where the security level is high, a position used for authentication is more randomly selected. Specifically, a position where an aerial image is formed is not changed in a preset order but selected randomly from among all positions where an aerial image can be formed.

When the information on the security level is acquired, the processor 21 sets a position, a size, a direction, and the like of an aerial image expressing an object for authentication in accordance with the acquired information (step 22). The object for authentication may be a specific part of a body of a person who requests authentication or may be an information terminal which the person who requests authentication carries, as in the first exemplary embodiment.

When settings of the position and the like of the aerial image are completed, the processor 21 instructs an aerial image forming device 10 (see FIG. 1) to form the aerial image (step 4). The contents of processes in step 4 and subsequent steps are similar to those in the first exemplary embodiment.

Figure 17A:
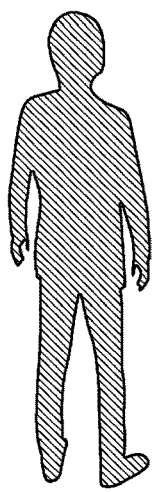
FIGS. 17A through 17C are views for explaining formation of an aerial image in accordance with a security level in a place where authentication is executed.
Figure 17A:
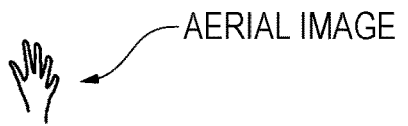
Figure 17A:
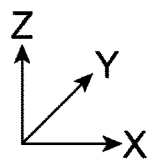
Figure 17B:
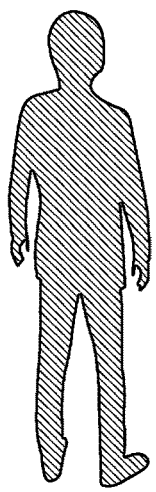
Figure 17B:
Figure 17B:
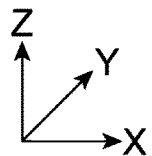
Figure 17C:
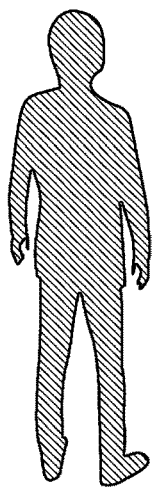
Figure 17C:
Figure 17C:
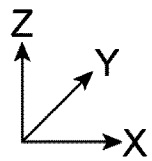

FIGS. 17A through 17C are views for explaining formation of an aerial image in accordance with a level of security in a place where authentication is executed. FIG. 17A illustrates a position of an aerial image formed in N-th authentication (hereinafter referred to as "authentication #N"), FIG. 17B illustrates a position of an aerial image formed in (N+1)th authentication (hereinafter referred to as "authentication #N+1"), and FIG. 17C illustrates a position of an aerial image formed in (N+2)th authentication (hereinafter referred to as "authentication #N+2").

In the example illustrated in FIGS. 17A through 17C, the security level is high. Accordingly, a position where an aerial image is formed is changed every authentication.

In the authentication #N, an aerial image expressing a right hand is formed in parallel with a plane defined by the X-axis and the Z-axis. In this case, a back of the right hand faces a person who requests authentication.

In the authentication #N+1, an aerial image expressing a right hand is formed in parallel with a plane defined by the X-axis and the Y-axis. In this case, a palm of the right hand faces the ground.

In the authentication #N+2, an aerial image expressing a right hand is formed in parallel with a plane defined by the Y-axis and the Z-axis. In this case, a palm of the right hand faces a right side in FIG. 17C.

Since a direction of an aerial image is changed every authentication irrespective of whether authentication is executed on the same person or different persons and whether authentication is executed on an adult or a child, a person who requests authentication needs to face a direction selected in each authentication.

In the present exemplary embodiment, the techniques described in the first exemplary embodiment and the second exemplary embodiment may be combined.

Fourth Exemplary Embodiment

In the present exemplary embodiment, another example in which information on a level of security requested for authentication is used as a situation in a place where authentication is executed is described.

In the third exemplary embodiment, even in a case where a security level is low, an aerial image is formed in the air every authentication, and the aerial image disappears from the air when the authentication ends. In the present exemplary embodiment, an aerial image is always present in the air in a case where a security level is lower than a predetermined threshold value.

Figure 18:
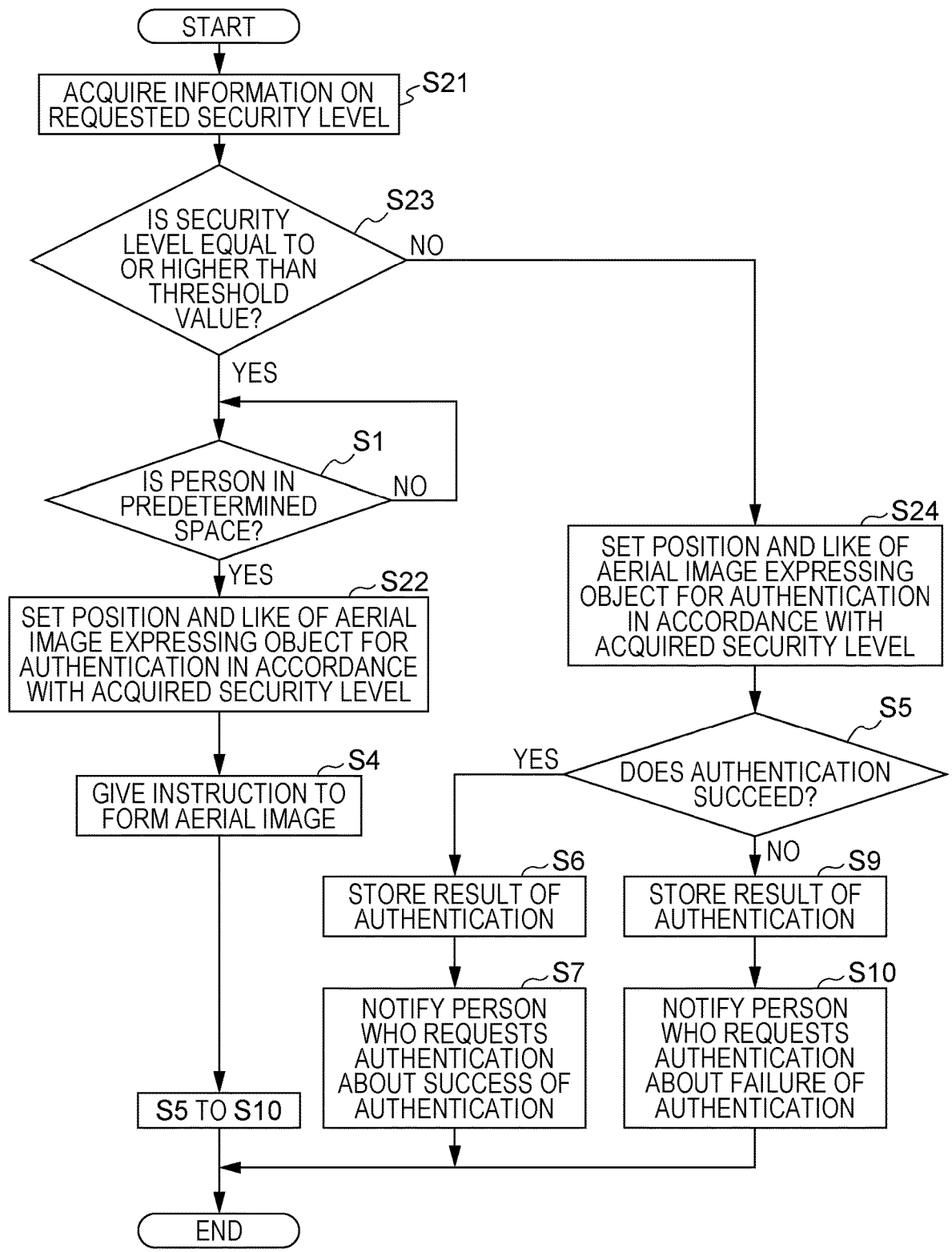
FIG. 18 is a flowchart for explaining a procedure of an authentication process executed in the fourth exemplary embodiment.

FIG. 18 is a flowchart for explaining a procedure of an authentication process executed in the fourth exemplary embodiment. The process illustrated in FIG. 18 is realized by execution of a program by the processor 21 (see FIG. 1). In FIG. 18, parts corresponding to those in FIG. 16 are given corresponding reference signs.

First, the processor 21 acquires information on a requested security level (step 21).

When the information on the security level is acquired, the processor 21 determines whether or not the acquired security level is equal to or higher than a threshold value (step 23).

In a case where a positive result is obtained in step 23, the processor 21 determines whether or not a person is in a predetermined space (step 1).

The processor 21 repeats the determination in step 1 while a negative result is being obtained in step 1.

In a case where a positive result is obtained in step 1, the processor 21 sets a position and the like of an aerial image expressing an object for authentication in accordance with the acquired security level (step 22). The position and the like thus set include a size of the aerial image. Since step 22 is executed in a case where the security level is high, settings of the position and the like of an aerial image are frequently changed. Processes in subsequent steps are identical to those in the third exemplary embodiment.

Meanwhile, in a case where a negative result is obtained in step 23, the processor 21 sets a position, a size, a direction, and the like of an aerial image expressing an object for authentication in accordance with the acquired security level (step 24). However, the frequency of update of settings of the position and the like in step 24 is lower than that in step 22. This is because the security level is low. In a case where the security level is low, an aerial image is always present, and therefore the processor 21 determines whether or not authentication has succeeded without giving an instruction to form an aerial image (step 5).

In a case where the authentication succeeds, the processor 21 obtains a positive result in step 5. In this case, the processor 21 stores the result of the authentication and notifies a person about success of the authentication (steps 6 and 7). Unlike the other exemplary embodiments, formation of the aerial image is kept even after execution in step 7. Accordingly, in a case where a color of the aerial image is changed to notify the person about success of the authentication in step 7, the change of the aerial image is reset after elapse of a predetermined period. Also in a case where the aerial image formed in the air is changed to an aerial image indicative of success of the authentication, the aerial image is changed back to the aerial image expressing a part or the like used for authentication.

Meanwhile, in a case where the authentication fails, the processor 21 obtains a negative result in step 5. In this case, the processor 21 stores the result of the authentication and notifies the person about failure of the authentication (steps 9 and 10). Even after execution in step 10, formation of the aerial image is kept. Accordingly, in a case where a color of the aerial image is changed to notify the person about failure of the authentication in step 10, the change of the aerial image is reset after elapse of a predetermined period. Also in a case where the aerial image formed in the air is changed to an aerial image indicative of failure of the authentication, the aerial image is changed back to the aerial image expressing a part used for authentication.

Fifth Exemplary Embodiment

In the present exemplary embodiment, a case where the information processing system 1 (see FIG. 1) described in the above exemplary embodiments is used for authentication of an image forming apparatus is described.

Figure 19:
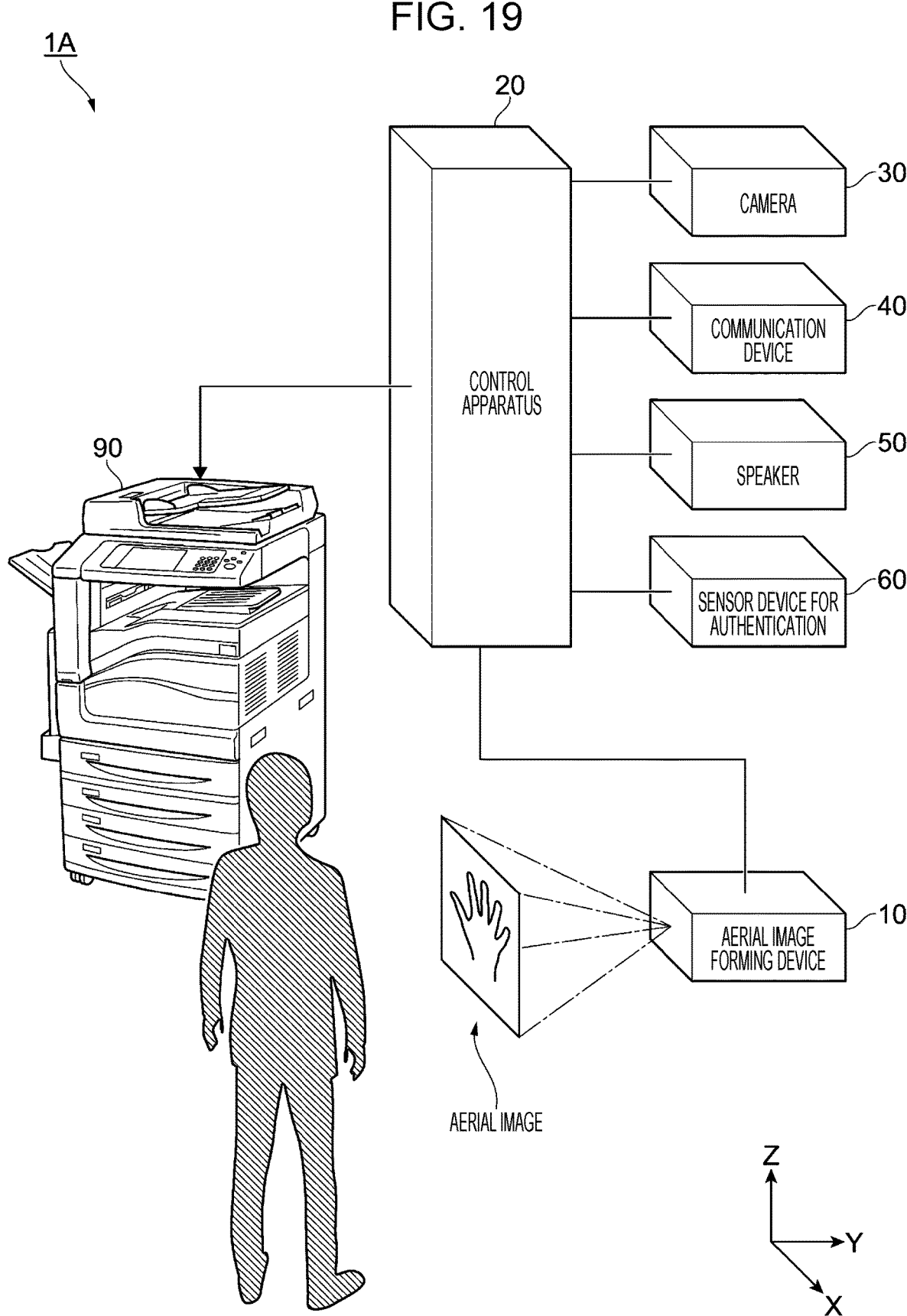
FIG. 19 illustrates an example of a configuration of an information processing system used in the fifth exemplary embodiment.

FIG. 19 illustrates an example of a configuration of an information processing system 1A used in the fifth exemplary embodiment. In FIG. 19, parts corresponding to those in FIG. 1 are given corresponding reference signs.

In the information processing system 1A illustrated in FIG. 19, an image forming apparatus 90 is added as an example of an apparatus that requests authentication. The image forming apparatus 90 is communicably connected to the control apparatus 20 and receives a notification about a result (success or failure) of authentication. In a case where the authentication succeeds, the image forming apparatus 90 permits use of an authenticated person within an authority given to this person.

The image forming apparatus 90 according to the present exemplary embodiment has plural functions including a function of reading an image from a document, a function of forming an image on paper, and a function of controlling facsimile communication.

Hardware for realizing the function of reading an image from a document is also called a scanner or an image reading device. Hardware for realizing the function of forming an image on paper is also called a printer. Hardware for realizing the function of controlling facsimile communication is called a fax machine.

Although parts that constitute the information processing system 1A are illustrated as devices independent of the image forming apparatus 90 in FIG. 19, the control apparatus 20 may be included in the image forming apparatus 90. Any one or more of an aerial image forming device 10, a camera 30, a communication device 40, a speaker 50, and a sensor device for authentication 60 may be included in the image forming apparatus 90.

The image forming apparatus 90 is not limited to one having all of the above functions and may be one having one or more of the above functions or may be one having only a specific function.

Other Exemplary Embodiments

Although the exemplary embodiments of the present disclosure have been described above, the technical scope of the present disclosure is not limited to the scope described in the above exemplary embodiments. It is apparent from the claims that various changes or modifications of the above exemplary embodiments are also encompassed within the technical scope of the present disclosure.

Although the aerial image forming device 10 (see FIG. 1) and the control apparatus 20 (see FIG. 1) are independent of each other in the above exemplary embodiments, the aerial image forming device 10 and the control apparatus 20 may be integral with each other.

The control apparatus 20 according to the above exemplary embodiments may be a computer, may be a smartphone or any of other information terminals, or may be a server on the Internet.

In the above exemplary embodiments, it is assumed that a result of authentication is obtained in a short time after an object used for authentication is placed over an aerial image. However, it sometimes takes time to complete authentication. In such a case, an aerial image notifying a person that it takes time to complete authentication or an aerial image notifying a person about a time it takes to complete authentication may be formed. Such a notification is not limited to a notification using an aerial image but may be a notification using sound or any of other methods.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to
   select a presentation location of a target image from a plurality of potential target image presentation locations based upon a predetermined criteria, and at a place where authentication is executed, the target image being formed in air to indicate a position where information is to be read in a non-contact manner from an object used for the authentication, wherein:
the predetermined criteria includes characteristics of a body of a person who requests the authentication, and a position where the target image is formed is selected in accordance with a direction of the body of the person who requests the authentication.

2. The information processing apparatus according to claim 1, wherein
   a height at which the image is formed is changed in accordance with a body height of the person who requests the authentication.

3. The information processing apparatus according to claim 1, wherein
   a height at which the image is formed is changed in accordance with an age group to which the person who requests the authentication belongs.

4. The information processing apparatus according to claim 1, wherein
   the target image disappears from the air in a case where the authentication succeeds.

5. The information processing apparatus according to claim 4, wherein
   in a case where the authentication succeeds, the processor outputs sound notifying an authenticated person about the success of the authentication.

6. The information processing apparatus according to claim 1, wherein
   in a case where the authentication succeeds, an image of an opened door is formed in the air in front of an authenticated person.

7. The information processing apparatus according to claim 1, wherein
   in a case where there are plural persons in the place where the authentication is executed, the target image is formed in a manner suitable for the plural persons.

8. The information processing apparatus according to claim 1, wherein
   in a case where the authentication fails, an image indicative of the failure of the authentication is formed in the air.

9. The information processing apparatus according to claim 8, wherein
   an image of a closed door is formed in front of a person who requests the authentication as the image indicative of the failure of the authentication.

10. The information processing apparatus according to claim 8, wherein
    in a case where the authentication fails, the processor outputs sound notifying a person who requests the authentication about the failure of the authentication.

11. A non-transitory computer readable medium storing a program causing a computer to execute a process for information processing, the process comprising:
    selecting a presentation location of a target image from a plurality of potential target image presentation locations based upon a predetermined criteria, and at a place where authentication is executed, the image being formed in air to indicate a position where information is to be read in a non-contact manner from an object used for the authentication, wherein:
    the predetermined criteria includes characteristics of a body of a person who requests the authentication, and a position where the target image is formed is selected in accordance with a direction of the body of the person who requests the authentication.

* * * * *